US007363415B2

(12) United States Patent
Chu

(10) Patent No.: US 7,363,415 B2

(45) **Date of Patent: *Apr. 22, 2008**

(54) COMPUTER SYSTEM UTILIZING MULTIPLE COMPUTER MODULES WITH SERIAL INTERFACE

(75) Inventor: William W. Y. Chu, Los Altos, CA (US)

(73) Assignee: ACQis Technology, Inc., Mountain View, CA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/097,694

(22) Filed: Mar. 31, 2005

(65) Prior Publication Data

US 2005/0182882 A1 Aug. 18, 2005

Related U.S. Application Data

(63) Continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.
*G06F 13/20* (2006.01)

(52) U.S. Cl. ...................... 710/313; 710/301; 710/315; 709/227

(58) Field of Classification Search ........ 710/300–317, 710/62–64, 72–73; 709/214–219, 226–227
See application file for complete search history.

(56) References Cited

U.S. PATENT DOCUMENTS 3,996,585 A 12/1976 Hogan (Continued)

FOREIGN PATENT DOCUMENTS

EP 722138 A1 7/1996

(Continued)

OTHER PUBLICATIONS

Bernal, Carlos, product brochure entitled: "PowerSMP Series 4000", (Mar. 1998) <<http://www/winnetmag.com/Windows/Article/ArticleID/3095/3095.html, downloaded from the web on Jun. 22, 2004, 2 pgs.

(Continued)

*Primary Examiner*—Raymond N Phan
(74) *Attorney, Agent, or Firm*—Townsend and Townsend and Crew LLP

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

89 Claims, 16 Drawing Sheets

U.S. PATENT DOCUMENTS 4,623,964 A 11/1986 Getz et al.
4,700,362 A 10/1987 Todd et al.
4,769,764 A 9/1988 Levanon
4,872,091 A 10/1989 Maniwa et al.
4,890,282 A 12/1989 Lambert et al.
4,918,572 A 4/1990 Tarver et al.
4,939,735 A 7/1990 Fredericks et al.
5,056,141 A 10/1991 Dyke
5,086,499 A 2/1992 Mutone
5,251,097 A 10/1993 Simmons et al.
5,278,509 A 1/1994 Haynes et al.
5,278,730 A 1/1994 Kikinis
5,293,497 A 3/1994 Free
5,311,397 A 5/1994 Harshberger et al.
5,317,477 A 5/1994 Gillett
5,319,771 A 6/1994 Takeda
5,331,509 A 7/1994 Kikinis
5,355,391 A 10/1994 Horowitz et al.
5,428,806 A 6/1995 Pocrass
5,436,857 A 7/1995 Nelson et al.
5,463,742 A 10/1995 Kobayashi
5,539,616 A 7/1996 Kikinis
5,550,710 A 8/1996 Rahamim et al.
5,550,861 A 8/1996 Chan et al.
5,578,940 A 11/1996 Dillon
5,600,800 A 2/1997 Kikinis et al.
5,603,044 A 2/1997 Annapareddy et al.
5,606,717 A 2/1997 Farmwald et al.
5,608,608 A 3/1997 Flint et al.
5,630,057 A 5/1997 Hait
5,638,521 A 6/1997 Buchala et al.
5,640,302 A * 6/1997 Kikinis ....................... 361/687
5,659,773 A 8/1997 Huynh et al.
5,663,661 A 9/1997 Dillon et al.
5,673,174 A 9/1997 Hamirani
5,680,126 A 10/1997 Kikinis
5,689,654 A 11/1997 Kikinis
5,721,837 A 2/1998 Kikinis
5,721,842 A 2/1998 Beasley et al.
5,745,733 A 4/1998 Robinson
5,752,080 A 5/1998 Ryan
5,764,924 A 6/1998 Hong
5,774,704 A 6/1998 Williams
5,795,228 A 8/1998 Trumbull
5,809,538 A 9/1998 Pollmann
5,815,681 A 9/1998 Kikinis
5,819,050 A 10/1998 Boehling et al.
5,826,048 A 10/1998 Dempsey et al.
5,848,249 A 12/1998 Garbus
5,859,669 A 1/1999 Prentice
5,907,566 A 5/1999 Benson et al.
5,941,965 A 8/1999 Moroz
5,948,047 A 9/1999 Jenkins et al.
5,960,213 A 9/1999 Wilson
5,968,144 A 10/1999 Walker et al.
5,971,804 A 10/1999 Gallagher et al.
5,977,989 A 11/1999 Lee et al.
5,978,919 A * 11/1999 Doi et al. ..................... 726/36
5,982,363 A 11/1999 Naift
5,991,163 A 11/1999 Marconi et al.
5,991,844 A 11/1999 Khosrowpour
5,999,952 A 12/1999 Jenkins et al.
6,002,442 A 12/1999 Li et al.
6,003,105 A 12/1999 Vicard et al.
6,011,546 A 1/2000 Bertram
6,016,252 A 1/2000 Pignolet et al.
6,028,643 A 2/2000 Jordan et al.
6,029,183 A 2/2000 Jenkins et al.
6,038,621 A 3/2000 Gale et al.
6,040,792 A 3/2000 Watson et al.
6,052,513 A 4/2000 MacLaren
6,069,615 A 5/2000 Abraham et al.
6,088,224 A 7/2000 Gallagher et al.
6,088,752 A 7/2000 Ahern
6,157,534 A 12/2000 Gallagher et al.
6,163,464 A 12/2000 Ishibashi et al.
6,175,490 B1 1/2001 Papa et al.
6,202,169 B1 3/2001 Razzaghe-Ashrafi et al.
6,208,522 B1 3/2001 Manweiler et al.
6,216,185 B1 4/2001 Chu
6,260,155 B1 7/2001 Dellacona
6,289,376 B1 9/2001 Taylor et al.
6,304,895 B1 10/2001 Schneider et al.
6,311,268 B1 10/2001 Chu
6,314,522 B1 11/2001 Chu et al.
6,317,329 B1 11/2001 Dowdy et al.
6,321,335 B1 11/2001 Chu
6,332,180 B1 12/2001 Kauffman et al.
6,345,330 B2 2/2002 Chu
6,366,951 B1 4/2002 Schmidt
6,378,009 B1 4/2002 Pinkston, II et al.
6,381,602 B1 4/2002 Shoroff et al.
6,393,561 B1 5/2002 Hagiwara et al.
6,401,124 B1 6/2002 Yang et al.
6,425,033 B1 7/2002 Conway et al.
6,452,789 B1 9/2002 Pallotti et al.
6,452,790 B1 9/2002 Chu et al.
6,453,344 B1 9/2002 Ellsworth
6,498,361 B1 12/2002 Kim et al.
6,549,966 B1 4/2003 Dickens et al.
6,564,274 B1 5/2003 Heath et al.
6,643,777 B1 11/2003 Chu
6,718,415 B1 4/2004 Chu
6,725,317 B1 4/2004 Bouchier et al.
7,099,981 B2 8/2006 Chu
7,146,446 B2 12/2006 Chu

FOREIGN PATENT DOCUMENTS

JP 6-289953 10/1994
WO WO 92/18924 10/1992
WO WO 94/00097 1/1994
WO WO 95/13640 5/1995

OTHER PUBLICATIONS

Cragle, Jonathan, “Density System 1100”, May 1999) <<http://www.winnetmag.com/Windows/Article/ArticleID/5199/5199.html>>, downloaded from web on Jun. 21, 2004, 4 pgs.

Feldman, Jonathan, “Rack Steady: The Four Rack-Mounted Servers That Rocked Our Network”, <<http://www.networkcomputing.com/shared/printArticle.jhtml?article=/910/910r3side1.htm . . . >> Jun. 23, 2004, 3 pgs.

Fetters, Dave, “Cubix High-Density Server Leads the Way With Standout Management Software”, (Feb. 8, 1999) <<http://www.nwc.com/shared/printArticle.jhtml?article=/1003/1003r3full.html&pub=nwc>>, downloaded from the web on Jun. 23, 2004, 5 pgs.

Gardner, Michael and Null, Christopher, “A Server Condominium”, <<http://www.lantimes.com/testing/98jun/806a042a.html>>, Jun. 23, 2004, 3 pgs.

Harrison, Dave, “VME in the Military: The M1A2 Main Battle Tank Upgrade Relies on COTS VME” <<http://www.dy4.com>>, (Feb. 9, 1998), pp. 1-34.

Williams, Dennis, “Consolidated Servers”, (Feb. 17, 1997) <<http://www.lantimes.com/testing/97compare/pcconsol.html>> downloaded from web on Jun. 23, 2004, 2 pgs.

Williams, Dennis, “Executive Summary: Consolidate Now”, (Feb. 17, 1997) <<http://www.lantimes.com/testing/97feb/702b064a.html>> downloaded from web on Jun. 23, 2004, 2 pgs.

Williams, Dennis, “Top Scores for Useability and Openness”, (Feb. 17, 1997) <<http://www.lantimes.com/testing/97feb/702b064a.html>> downlaoded from web on Jun. 23, 2004, 2 pgs.

Williams, Dennis, “ChatCom Inc. Chatterbox”, (Feb. 17, 1997) <<http://www.lantimes.com/testing/97feb/702b066a.html>> downloaded from web on Jun. 23, 2004, 3 pgs.

Williams, Dennis, "EVERSYS Corp. System 8000", (Feb. 17, 1997) <<http://www.lantimes.com/testing/97feb/702b070b.html>> downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.

Crystal Advertisement for "Rackmount Computers", (© 2000-2004) <<http://www.crystalpc.com/products/roservers.asp>>, downloaded from web on Jun. 17, 2004, 8 pgs.

Crystal Advertisement for "QuickConnect® Cable Management", (© 2000-2004) <<http://www.crystalpc.com/products/quickconnect.asp>> downloaded from web on Jun. 17, 2004, 4 pgs.

Cubix Product Brochure entitled, "Density System", (© 2000) <<http://64.173.211.7/support/techinfo/system/density/density10.htm>> downloaded from web on Jun. 22, 2004, 3 pgs.

Cubix Product Brochure entitled, "Density System, Technical Specifications", (© 2000) <<http://64.173.211.7/support/techinfo/system/density/info/spec.htm>> downloaded from web on Jun. 22, 2004, 2 pgs.

Cubix Product Manual entitled, "Density System", Chapter 1-Introduction, (© 2000) <<http://64.173.211.7/support/techinfo/manuals/density/Chap-1.htm>> downloaded from web on Jun. 22, 2004, 5 pgs.

Cubix, "Click on the front panel that matches your system", (© 2000) <<http://64.173.211.7/support/techinfo/system/density/density.htm>> downloaded from web on Jun. 22, 2004, 1 pg.

Cubix Product Manual entitled, "Density System", Chapter 2-Installation, (© 2000) <<http://64.173.211.7/support/techinfo/manuals/density/Chap-2.htm>> downloaded from web on Jun. 22, 2004, 9 pgs.

Cubix Product Manual entitled, "Density System", Chapter 3-Operation, (© 2000) <<http://64.173.211.7/support/techinfo/manuals/density/Chap-3.htm>> downloaded from web on Jun. 22, 2004, 4 pgs.

Cubix Product Manual entitled, "Density System", Chapter 4-Maintenance and Repair, (© 2000) <<http://64.173.211.7/support/techinfo/manuals/density/Chap-4.htm>> downloaded from web on Jun. 22, 2004, 4 pgs.

Cubix, "What are Groups?", (© 2000) <<http://64.173.211.7/support/techinfo/system/density/info/groups.htm>>, downloaded from web on Jun. 22, 2004, 3 pgs.

Cubix, "SP 5200XS Series Plug-in Computers", (© 2000) <<http://64.173.211.7/support/techinfo/bc/sp5200xs/intro.htm>>, downloaded from web on Jun. 22, 2004, 2 pgs.

Cubix, "SP 5200XS Series Technical Specifications", (© 2000) <<http://64.173.211.7/support/techinfo/sp5200xs/spec.htm>>, downloaded from web on Jun. 22, 2004, 2 pgs.

Cubix, "SP 5200 Series" Chapter 1-Introduction, (© 2000) <<http://64.173.211.7/support/techinfo/manuals/sp5200/chap-1.htm>>, downloaded from web on Jun. 22, 2004, 3 pgs.

Cubix, "SP 5200 Series" Chapter 2-Switches & Jumpers, (© 2000) <<http://64.173.211.7/support/techinfo/manuals/sp5200/chap-2.htm>>, downloaded from web on Jun. 22, 2004, 3 pgs.

Cubix, "SP 5200 Series" Chapter 3-Installation, (© 2000) <<http://64.173.211.7/support/techinfo/manuals/sp5200/chap-3.htm>>, downloaded from web on Jun. 22, 2004, 4 pgs.

Cubix, "SP 5200 Series" Chapter 4-Technical Reference, (© 2000) <<http://64.173.211.7/support/techinfo/manuals/sp5200/chap-4.htm>>, downloaded from web on Jun. 22, 2004, 3 pgs.

Cubix, "DP 6200 'D' Series Plug-in Computers" <<http://64.173.211.7/support/techinfo/bc/dp/6200d/intro.htm>>, downloaded from web on Jun. 22, 2004, 3 pgs.

Cubix, "Installing DP or SP Series Boards" (© 2000) <<http://64.173.211.7/support/techinfo/bc/dp/6200d/intro.htm>>, downloaded from web on Jun. 22, 2004, 2 pgs.

Cubix, "Powering On/Off or Resetting Plug-in Computers in an Density System", (© 2000) <<http://64.173.211.7/support/techinfo/density/info/power.htm>>, downloaded from web on Jun. 22, 2004, 2 pgs.

Cubix, "Multiplexing Video, Keyboard & Mouse with Multiple Density Systems", (© 2000) <<http://64.173.211.7/support/techinfo/system/density/info/vkm-mux.htm>>, downloaded from web on Jun. 22, 2004, 2 pgs.

eBay Advertisement for "Total IT Group Network Engines", <<http://cgi.ebay.com/we/eBayISAPI.dll?ViewItem &item=5706388046 &sspagename+STRK%3AMDBI%3AMEBI3AIT&rd=1>>, downloaded from web on Jun. 25, 2004, 1 pg.

"Features Chart", (Feb. 1, 1997) <<http://www.lantimes.com/testing/97feb/702b072a.html>>, downloaded from web on Jun. 23, 2004, 3 pgs.

Internet Telephone Roundup, "Industrial Computers", <<http://www.tmcnet.com/articles/itmag/0499/0499roundup.htm>>, downloaded from web on Jun. 23, 2004, 5 pgs.

Press Release: Hiawatha, Iowa, (Mar. 1, 1997) entitled "Crystal Group Products Offer Industrial PCs with Built-in Flexibility", <<http://www.crystalpc.com/news/pressreleases/prodpr.asp>>, downloaded from web on May 14, 2004, 2 pgs.

Press Release: Kanata, Ontario, Canada, (Apr. 1998) entitled "Enhanced COTS SBC from DY 4 Systems features 166MHz Pentium™ Processor" <<http://www.realtime-info.be/VPR/layout/display/pr.asp?/pr.asp?PRID=363>>, 2 pgs.

Product Brochure entitled "SVME/DM-192 Pentium® II Single Board Computer" (Jun. 1999) pp. 1-9.

Product Brochure entitled "System 8000", <<http://www.bomara.com/Eversys/briefDefault.htm>>, downloaded from web on Jun. 22, 2004, 4 pgs.

Product Brochure entitled: "ERS/FT II System", (© 2000) <<http://64.173.211.7/support/techinfo/system/ersft2.htm>>, downloaded from web on Jun. 22, 2004, 4 pgs.

Product Manual entitled: "ERS II and ERS/FT II", Chap. 3, System Components,<<http://64.173.211.7/support/techinfo/manuals/ers2/ers2-c3.htm>>, downloaded from web on Jun. 22, 2004, 21 pgs.

Product Manual entitled: "ERS II and ERS/FT II", Chap. 6, Component Installation,<<http://64.173.211.7/support/techinfo/manuals/ers2/ers2-c6.htm>>, downloaded from web on Jun. 22, 2004, 18 pgs.

Windows Magazine, "Cubix PowerSMP Series 4000", Nov. 1997, <http://<www.techweb.com/winmag/library/1997/1101/intent008.htm>> downloaded from the web on Jun. 22, 2004, p. NT07.

MPL, "The First Rugged All-in-One Industrial 486FDX-133 MHz PC", IPM486/IPM5 User Manual, 1998, pp. 1-24.

CETIA Brochure "CETIA Powerengine CVME 603e" pp. 1-6 downloaded from the internet at. http://www.cetia.com/ProductAddOns/wp-47-01.pdf on Feb. 15, 2006.

MPL Brochure "1st Rugged All in One Industrial 486FDX-133 MHz PC" pp. 1-2, downloaded from the Internet at. http://www.mpl.ch/DOCs/ds48600.pdf on Feb. 15, 2006.

MPL Brochure "IPM 486 Brochure/IPM5 User Manual" pp. 1-9 downloaded from the Internet at http://www.mpl.ch/DOCs/u48600xd.pdf on Feb. 15, 2006.

Snyder, Joel "Better Management through consolidation" pp. 1-6 downloaded from the internet at http://www.opus1.com/www/jms/nw-con-0818rev.html, unknown date.

Agerwala, T., Systems Journal "SP2 System Architecture" vol. 34, No. 2, 1995 Scalable Parallel Computing vol. 34, No. 2, 1995.

* cited by examiner

| | Symbol | Signal | Data Rate | Description |
|---|---|---|---|---|
| 1 | PD0 RTN | | | GND |
| 2 | PD0 + | Synch. To PCK | 10 x clock rate | Computer to Peripheral LVDS Data 0 + |
| 3 | PD0 - | | | Computer to Peripheral LVDS Data 0 - |
| 4 | PD1 RTN | | | GND |
| 5 | PD1 + | Synch. To PCK | 10 x clock rate | Computer to Peripheral LVDS Data 1 + |
| 6 | PD1 - | | | Computer to Peripheral LVDS Data 1 - |
| 7 | PD2 RTN | | | GND |
| 8 | PD2 + | Synch. To PCK | 10 x clock rate | Computer to Peripheral LVDS Data 2 + |
| 9 | PD2 - | | | Computer to Peripheral LVDS Data 2 - |
| 10 | PD3 RTN | | | GND |
| 11 | PD3 + | Synch. To PCK | 10 x clock rate | Computer to Peripheral LVDS Data 3 + |
| 12 | PD3 - | | | Computer to Peripheral LVDS Data 3 - |
| 13 | PCK RTN | | | GND |
| 14 | PCK + | Clock | Clock rate | Computer to Peripheral LVDS Clock + |
| 15 | PCK - | | | Computer to Peripheral LVDS Clock - |
| 16 | PCN RTN | | | GND |
| 17 | PCN + | Synch. To PCK | 10 x clock rate | Computer to Peripheral LVDS Control + |
| 18 | PCN - | | | Computer to Peripheral LVDS Control - |
| 19 | PDR0 RTN | | | GND |
| 20 | PDR0 + | Synch. To PCKR | 10 x clock rate | Peripheral to Computer LVDS Data 0 + |
| 21 | PDR0 - | | | Peripheral to Computer LVDS Data 0 - |
| 22 | PDR1 RTN | | | GND |
| 23 | PDR1 + | Synch. To PCKR | 10 x clock rate | Peripheral to Computer LVDS Data 1 + |
| 24 | PDR1 - | | | Peripheral to Computer LVDS Data 1 - |
| 25 | PDR2 RTN | | | GND |
| 26 | PDR2 + | Synch. To PCKR | 10 x clock rate | Peripheral to Computer LVDS Data 2 + |
| 27 | PDR2 - | | | Peripheral to Computer LVDS Data 2 - |
| 28 | PDR3 RTN | | | GND |
| 29 | PDR3 + | Synch. To PCKR | 10 x clock rate | Peripheral to Computer LVDS Data 3 + |
| 30 | PDR3 - | | | Peripheral to Computer LVDS Data 3 - |
| 31 | PCKR RTN | | | GND |
| 32 | PCKR + | Reverse Dir. Clock | Clock rate | Peripheral to Computer LVDS Clock + |
| 33 | PCKR - | | | Peripheral to Computer LVDS Clock - |
| 34 | PCNR RTN | | | GND |
| 35 | PCNR + | Synch. To PCKR | 10 x Clock rate | Peripheral to Computer LVDS Control + |
| 36 | PCNR - | | | Peripheral to Computer LVDS Control - |
| 37 | RESET# | | Asynchronous | Reset |

FIG.12

| PCK | CK+ | CK+ | CK+ | CK+ | CK+ | CK- | CK- | CK- | CK- | CK- |
|---|---|---|---|---|---|---|---|---|---|---|
| PD0 | BS0 | CM0# | A00 | A01 | A02 | A03 | A04 | A05 | A06 | A07 |
| PD1 | BS1 | CM1# | A08 | A09 | A10 | A11 | A12 | A13 | A14 | A15 |
| PD2 | BS2 | CM2# | A16 | A17 | A18 | A19 | A20 | A21 | A22 | A23 |
| PD3 | BS3 | CM3# | A24 | A25 | A26 | A27 | A28 | A29 | A30 | A31 |
| PCN | CN0 | CN1 | CN2 | CN3 | CN4 | CN5 | CN6 | CN7 | CN8 | CN9 |

| PCK | CK+ | CK+ | CK+ | CK+ | CK+ | CK- | CK- | CK- | CK- | CK- |
|---|---|---|---|---|---|---|---|---|---|---|
| PD0 | BS0 | BE0# | D00 | D01 | D02 | D03 | D04 | D05 | D06 | D07 |
| PD1 | BS1 | BE1# | D08 | D09 | D10 | D11 | D12 | D13 | D14 | D15 |
| PD2 | BS2 | BE2# | D16 | D17 | D18 | D19 | D20 | D21 | D22 | D23 |
| PD3 | BS3 | BE3# | D24 | D25 | D26 | D27 | D28 | D29 | D30 | D31 |
| PCN | CN0 | CN1 | CN2 | CN3 | CN4 | CN5 | CN6 | CN7 | CN8 | CN9 |

FIG. 13

| BS0 | | | | | | | | | | | | | | | | | | |
|---|---|---|---|---|---|---|---|---|---|---|---|---|---|---|---|---|---|---|
| BS1 | | | | | | | | | | | | | | | | | | |
| BS2 | | | | | | | | | | | | | | | | | | |
| BS3 | | | | | | | | | | | | | | | | | | |
| 0 | C0# | A00 | A01 | A02 | A03 | A04 | A05 | A06 | A07 | BS0 | | | | | | | | |
| | C1# | A08 | A09 | A10 | A11 | A12 | A13 | A14 | A15 | BS1 | | | | | | | | |
| | C2# | A16 | A17 | A18 | A19 | A20 | A21 | A22 | A23 | BS2 | | | | | | | | |
| | C3# | A24 | A25 | A26 | A27 | A28 | A29 | A30 | A31 | BS3 | | | | | | | | |
| | CN0 | CN1 | CN2 | CN3 | CN4 | CN5 | CN6 | CN7 | CN8 | 1 | CN9 | CN10 | CN11 | CN12 | CN13 | CN14 | CN15 | CN16 | CN17 |
| | | PCK+ | | | PCK- | | | PCK+ | | | | | PCK- | | | | | |

| BS0 | | | | | | | | | | | | | | | | | | |
|---|---|---|---|---|---|---|---|---|---|---|---|---|---|---|---|---|---|---|
| BS1 | | | | | | | | | | | | | | | | | | |
| BS2 | | | | | | | | | | | | | | | | | | |
| BS3 | | | | | | | | | | | | | | | | | | |
| 0 | BE0# | D00 | D01 | D02 | D03 | D04 | D05 | D06 | D07 | BS0 | | | | | | | | |
| | BE1# | D08 | D09 | D10 | D11 | D12 | D13 | D14 | D15 | BS1 | | | | | | | | |
| | BE2# | D16 | D17 | D18 | D19 | D20 | D21 | D22 | D23 | BS2 | | | | | | | | |
| | BE3# | D24 | D25 | D26 | D27 | D28 | D29 | D30 | D31 | BS3 | | | | | | | | |
| | CN0 | CN1 | CN2 | CN3 | CN4 | CN5 | CN6 | CN7 | CN8 | 1 | CN9 | CN10 | CN11 | CN12 | CN13 | CN14 | CN15 | CN16 | CN17 |
| | | PCK+ | | | PCK- | | | PCK+ | | | | | PCK- | | | | | |

| Name | Type | Pins | Description |
|---|---|---|---|
| AD[31::0] | TS | 32 | Multiplexed Address/Data. AD is driven to a valid state when GNT# is asserted. |
| C/BE[3::0]# | TS | 4 | Multiplexed Command/Byte Enables. For a two-address transaction, 1st address phase carries the command, and the 2nd address phase carries the transaction type. C/BE is driven to a valid state when GNT# is asserted. |
| FRAME# | STS | 1 | Indicates beginning and duration of a PCI transaction. When the bus is idle, FRAME# is driven to High for 1 cycle. A pull-up resistor sustains STS signal. |
| IRDY# | STS | 1 | Initiator Ready. IRDY# is driven High for 1 cycle if bus is idle, and the state is sustained by a pull-up resistor. |
| TRDY# | STS | 1 | Target Ready. When bus is idle, TRDY# is driven High for 1 cycle if bus is idle. An external pull-up resistor sustains STS signal. |
| DEVSEL# | STS | 1 | Device Select. DEVSEL# is asserted by target to indicate it is ready to accept the transaction. HIC decodes address of a transaction to decide the need to assert DEVSEL#. As an initiator, HIC waits for 5 cycles to detect assertion of DEVSEL# by the target; otherwise HIC terminates with a master abort. DEVSEL# is driven High for 1 cycle when bus is idle, and the state is sustained by a pull-up resistor. |
| STOP# | STS | 1 | Target request to stop transaction. There are 3 cases:<br>STOP#, TRDY# & DEVSEL# asserted: disconnect with data transfer<br>Only STOP# & DEVSEL# asserted: request initiator to retry later<br>Only STOP# asserted: target abort<br>STOP# is driven High for 1 cycle when bus is idle, and the state is sustained by a pull-up resistor. |
| PAR | TS | 1 | Even parity for 36 bits of AD & C/BE#. PAR is sent one cycle after address or data is valid. In write transaction, initiator sends PAR one cycle after write data is valid. In read transaction, target sends PAR one cycle after read data is valid. |
| LOCK# | Input | 1 | Initiator request lock on target downstream. LOCK# is asserted 1 clock cycle after address phase by an initiator wanting to perform an atomic operation that take more than one transaction to complete. HIC passes the LOCK# request to the secondary PCI bus. HIC does not drive LOCK# or propagate LOCK# upstream. |
| IDSEL# | Input | 1 | Chip Select for Type 0 configuration access. During a Type 0 configuration transaction, the initiator asserts IDSEL# during the address phase to select HIC. HIC responds by asserting DEVSEL#. |
| PERR# | STS | 1 | Data Parity Error on all transactions except Special Cycle. PERR# is driven one clock cycle after PAR. PERR# is asserted by target during write transactions, and by initiator during read transactions. |
| SERR# | OD | 1 | System Error. HIC asserts SERR# under the following conditions:<br>Address parity error, Secondary bus SERR# asserted,<br>Posted write transaction: data parity error on target bus, Posted write transaction discarded,<br>Master abort, Target abort<br>Delayed read or write transaction discarded, and<br>Delayed transaction master timeout. |
| REQ# | TS | 1 | Request for bus. If a target retry or disconnect is received in response to initiating a transaction, HIC deasserts REQ# for at least 2 cycles before asserting it again. |
| GNT# | Input | 1 | Bus is granted to HIC. HIC can initiate transaction if GNT# is asserted and the bus is idle. When HIC is not requesting bus and GNT# is asserted, HIC must drive AD, C/BE, and PAR to valid logic levels. |
| CLKRUN# | I/OD | 1 | Input indicating clock status. HIC can request the central clock resource to start, speed up or maintain the PCI clock. There are 3 clocking states: Clock running, Clock about to stop/slow down, and Clock stopped/slowed. |
| PCICK | Input | 1 | PCI Clock. All inputs are sampled on the rising edge of PCICK. Frequency |

FIG. 16

COMPUTER SYSTEM UTILIZING MULTIPLE COMPUTER MODULES WITH SERIAL INTERFACE

CROSS REFERENCE TO RELATED APPLICATIONS

The present application claims priority as a continuation of U.S. nonprovisional patent application Ser. No. 10/772,214, filed Feb. 3, 2004 now U.S. Pat. No. 7,099,981, which is a continuation of U.S. nonprovisional patent application Ser. No. 09/569,758, filed May 12, 2000 (Now U.S. Pat. No. 6,718,415), which claimed priority to U.S. Provisional Application No. 60/134,122 filed May 14, 1999, commonly assigned, and hereby incorporated by reference.

BACKGROUND OF THE INVENTION

The present invention relates to computing devices. More particularly, the present invention provides a system including a plurality of computer modules that can independently operate to provide backup capability, dual processing, and the like. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel PentiumTM microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a ZipTM Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use.

Similar to separate desktop and portable computers, there is no commonality between two desktop computers. To date, most personal computers are constructed with a single motherboard that provides connection for CPU and other components in the computer. Dual CPU systems have been available through Intel's slot 1 architecture. For example, two Pentium II cartridges can be plugged into two "slot 1" card slots on a motherboard to form a Dual-processor system. The two CPU's share a common host bus that connects to the rest of the system, e.g. main memory, hard disk drive, graphics subsystem, and others. Dual CPU systems have the advantage of increased CPU performance for the whole system. Adding a CPU cartridge requires no change in operating systems and application software. However, dual CPU systems may suffer limited performance improvement if memory or disk drive bandwidth becomes the limiting factor. Also, dual CPU systems have to time-share the processing unit in running multiple applications. CPU performance improvement efficiency also depends on software coding structure. Dual CPU systems provide no hardware redundancy to help fault tolerance. In running multiple applications, memory and disk drive data throughput will become the limiting factor in improving performance with multi-processor systems.

The present invention generally relates to computer interfaces. More specifically, the present invention relates to an interface channel that interfaces two computer interface buses that operate under protocols that are different from that used by the interface channel.

Interfaces coupling two independent computer buses are well known in the art. A block diagram of a computer system utilizing such a prior art interface is shown in FIG. 5. In FIG. 5, a primary peripheral component interconnect (PCI) bus 505 of a notebook PC 500 is coupled to a secondary PCI bus 555 in a docking system 550 (also referred to as docking station 550) through high pin count connectors 501 and 502, which are normally mating connectors. The high pin count connectors 501 and 502 contain a sufficiently large number of pins so as to carry PCI bus signals between the two PCI buses without any translation. The main purpose for interfacing the two independent PCI buses is to allow transactions to occur between a master on one PCI bus and a target on the other PCI bus. The interface between these two independent PCI buses additionally includes an optional PCI to PCI bridge 560, located in the docking station 550, to expand the add on capability in docking station 550. The bridge 560 creates a new bus number for devices behind the bridge 560 so that they are not on the same bus number as other devices in the system thus increasing the add on capability in the docking station 550.

An interface such as that shown in FIG. 5 provides an adequate interface between the primary and secondary PCI buses. However, the interface is limited in a number of ways. The interface transfers signals between the primary and secondary PCI buses using the protocols of a PCI bus. Consequently, the interface is subject to the limitations under which PCI buses operate. One such limitation is the fact that PCI buses are not cable friendly. The cable friendliness of the interface was not a major concern in the prior art. However, in the context of the computer system of the present invention, which is described in the present inventor's (William W. Y. Chu's) application for "Personal Computer Peripheral Console With Attached Computer Module" filed concurrently with the present application on Sep. 8, 1998 and incorporated herein by reference, a cable friendly interface is desired for interfacing an attached computer module (ACM) and a peripheral console of the present invention. Furthermore, as a result of operating by PCI protocols, the prior art interface includes a very large number of signal channels with a corresponding large number of conductive lines (and a similarly large number of pins in the connectors of the interface) that are commensurate in number with the number of signal lines in the PCI buses which it interfaces. One disadvantage of an interface having a relatively large number of conductive lines and pins is that it costs more than one that uses a fewer number of conductive lines and pins. Additionally, an interface having a large number of conductive lines is bulkier and more cumbersome to handle. Finally, a relatively large number of signal channels in the interface renders the option of using differential voltage signals less viable because a differential voltage signal method would require duplicating a large number of signal lines. It is desirable to use a low voltage differential signal (LVDS) channel in the computer system of the present invention because an LVDS channel is more cable friendly, faster, consumes less power, and generates less noise, including electromagnetic interferences (EMI), than a PCI channel. The term LVDS is herein used to generically refer to low voltage differential signals and is not intended to be limited to any particular type of LVDS technology.

Thus, what is needed are computer systems that can have multiple computer modules. Each computer module has dedicated memory and disk drive, and can operate independently.

BRIEF SUMMARY OF THE INVENTION

According to the present invention, a technique including a method and device for multi-module computing is provided. In an exemplary embodiment, the present invention provides a system including a plurality of computer modules that can independently operate to provide backup capability, dual processing, and the like.

In a specific embodiment, the present invention provides a computer system for multi-processing purposes. The computer system has a console comprising a first coupling site and a second coupling site, e.g., computer module bay. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

In an alternative specific embodiment, the present invention provides a multi-processing computer system. The system has a console comprising a first coupling site and a second coupling site. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, a mass storage device coupled to the processing unit, and a video output coupled to the processing unit. Each of the computer modules is substantially similar in design to each other to provide independent processing of each of the computer modules in the computer system. A video switch circuit is coupled to each of the computer modules through the video output. The video switch is configured to switch a video signal from any one of the computer modules to a display.

Numerous benefits are achieved using the present invention over previously existing techniques. In one embodiment, the invention provides improved processing and maintenance features. The invention can also provide increased CPU performance for the whole system. The invention also can be implemented without changes in operating system and application software. The present invention is also implemented using conventional technologies that can be provided in the present computer system in an easy and efficient manner.

In another embodiment, the invention provides at least two users to share the same modular desktop system. Each user operates on a different computer module. The other peripheral devices, i.e. CDROM, printer, DSL connection, etc. can be shared. This provides lower system cost, less desktop space and more efficiency. Depending upon the embodiment, one or more of these benefits can be available. These and other advantages or benefits are described throughout the present specification and are described more particularly below.

In still further embodiments, the present invention provides methods of using multiple computer modules.

The present invention encompasses an apparatus for bridging a first computer interface bus and a second computer interface bus, where each of the first and second computer interface buses have a number of parallel multiplexed address/data bus lines and operate at a clock speed in a predetermined clock speed range having a minimum clock speed and a maximum clock speed. The apparatus comprises an interface channel having a clock line and a plurality of bit lines for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

The present invention overcomes the aforementioned disadvantages of the prior art by interfacing two PCI or PCI-like buses using a non-PCI or non-PCI-like channel. In the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.

The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.

In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a clock speed in a predetermined clock speed range having a minimum clock speed and a maximum clock speed. The apparatus comprises an interface channel having a clock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.

The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.

These and other embodiments of the present invention, as well as its advantages and features, are described in more detail in conjunction with the text below and attached Figs.

BRIEF DESCRIPTION OF THE DRAWINGS

FIG. 12 is a table showing the symbols, signals, data rate and description of signals in a first embodiment of the XPBus.

FIG. 13 is a table showing the information transmitted on the XPBus during two clock cycles of the XPBus in one embodiment of the present invention where 10 data bits transmitted in each clock cycle of the XPBus.

FIG. 16 is a table showing the names, types, number of pins dedicated to, and the description of the primary bus PCI signals.

DETAILED DESCRIPTION OF THE INVENTION

According to the present invention, a technique including a method and device for multi-module computing is provided. In an exemplary embodiment, the present invention provides a system including a plurality of computer modules that can independently operate to provide backup capability, dual processing, and the like.

Figure 1:
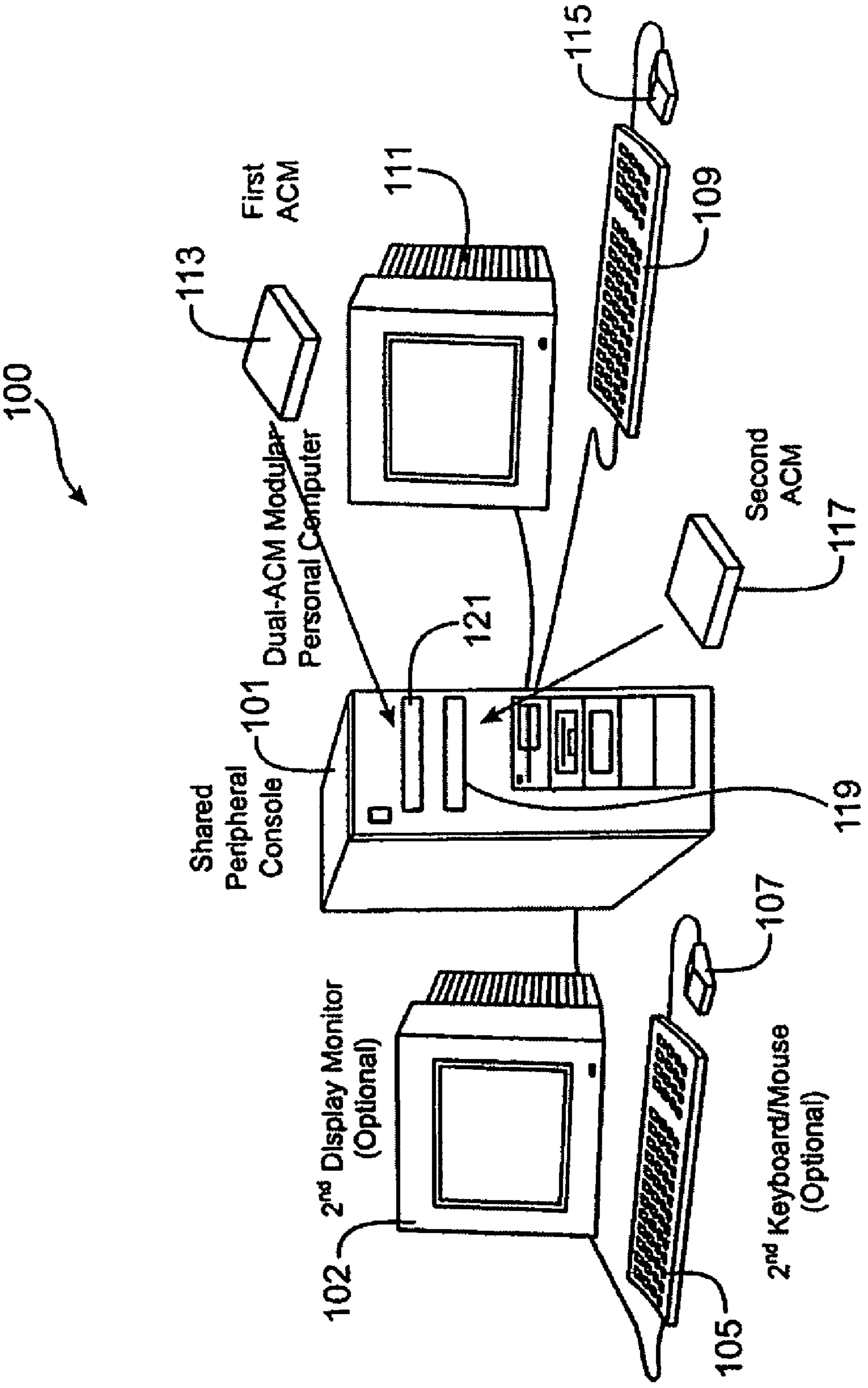
FIG. 1 is a simplified diagram of a computer system according to an embodiment of the present invention.

FIG. 1 is a simplified diagram of a computer system 100 according to an embodiment of the present invention. This diagram is merely an illustration and should not limit the scope of the claims herein. One of ordinary skill in the art would recognize other variations, modifications, and alternatives. The computer system 100 includes an attached computer module (i.e., ACM) 113, a desktop console 101, among other elements. The computer system also has another ACM module 117. Each ACM module has a respective slot 121, 119, which mechanically houses and electrically couples each ACM to the computer console. Also shown is a display 111, which connects to the console. Additionally, keyboard 109 and mouse 115 are also shown. A second display 102, keyboard 105, and mouse 107 can be coupled to the console in some optional embodiments to allow more than one user to operate the computer system. The computer system is modular and has a variety of components that are removable. Some of these components (or modules) can be used in different computers, workstations, computerized television sets, and portable or laptop units.

In the present embodiment, each ACM 113 includes computer components, as will be described below, including a central processing unit ("CPU"), IDE controller, hard disk drive, computer memory, and the like. The computer module bay (i.e., CMB) 121 is an opening or slot in the desktop console. The CMB houses the ACM and provides communication to and from the ACM. The CMB also provides mechanical protection and support to the ACM. The CMB has a mechanical alignment mechanism for mating a portion of the ACM to the console. The CMB further has thermal heat dissipation sinks, electrical connection mechanisms, and the like. Some details of the ACM can be found in co-pending patent application Ser. Nos. 09/149,882 and 09/149,548 filed Sep. 8, 1998, commonly assigned, and hereby incorporated by reference for all purposes.

In a specific embodiment, the present multiple computer module system has a peripheral console that has two or more computer bays that can receive a removable computer module or ACM. Multiple computer module system can function as a personal computer with only one ACM and the peripheral console. The second and additional ACM can be added later to increase overall system performance and reliability. The ACM operates independently as self-contained computer, communicates with each other through a high-speed serial communication and share most peripheral devices within the peripheral console. Each ACM controls its independent graphics subsystem and drives separate video output signals. A practical implementation is a dual ACM system. In a dual ACM system, two monitors can be used to display the two ACMs' graphics outputs at the same time. For a single monitor, a RGB switch is used to switch between the video outputs of the two ACMs and can be controlled by a command from the user. Similarly, input devices (i.e. keyboard and mouse) are switched between the two computer systems with a command from the user. Command from the user can be in the form of either a dedicated key on the keyboard or a special icon on the screen that the mouse can click on.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present system are described in more detail below. In a dual ACM system, the primary ACM can connect directly to the peripheral board in the peripheral console. The second ACM can connect either directly or indirectly to the peripheral board. For indirect connection, a receptacle board is added to allow a cable connection to the peripheral board. This is to facilitate the mechanical positioning of the second ACM inside the computer chassis. The receptacle board approach can even be used for the primary ACM if a high bandwidth peripheral bus, e.g. PCI Bus, is not connected from the primary ACM to the peripheral board.

The shared peripheral console has a chassis and a motherboard that connects the following devices:

1) Input means, e.g. keyboard and mouse,
2) Display means, e.g. RGB monitor,
3) Add-on means, e.g. PCI add-on slots, 4) Two Computer Module Bays (CMB) with connectors to two ACMs, 5) A serial communication Hub controller that interfaces to serial communication controller of both ACMs, 6) Shared storage subsystem, e.g. Floppy drive, CDROM drive, DVD drive, or 2nd Hard Drive, 7) Communication device, e.g. modem, 8) Power supply, and others.

The computer bay is an opening in the peripheral console that receives an ACM. CMB provides mechanical protection to ACM, mechanical alignment for connector mating, mechanical locking system to prevent theft and accidental removal, and connectors at the end of the opening for connecting to ACM. The interface bus between ACM and the peripheral console has a video bus, peripheral connections, serial communication connection, control signals and power connection. Video bus includes video output of graphics devices, i.e. analog RGB and control signals for monitor. Power connection supplies the power for ACM.

Figure 2:
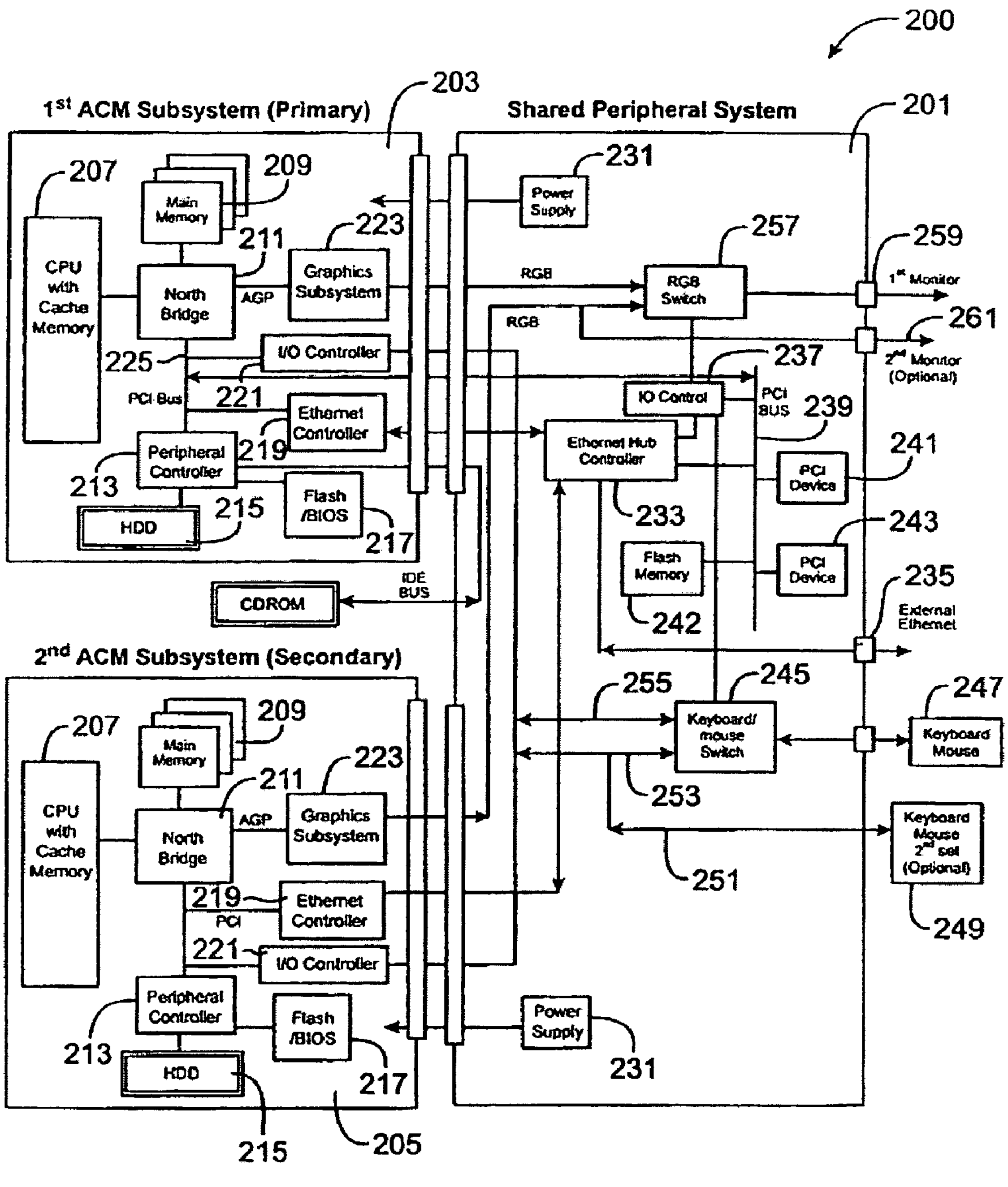
FIG. 2 is a simplified block diagram of a computer system according to an alternative embodiment of the present invention.

An implementation of peripheral sharing is the use of Ethernet controllers to bridge the communication between the two ACMs. Some of the peripheral devices residing in the peripheral console are shown in the simplified diagram of FIG. 2. As shown, the diagram is merely an illustration which should not limit the scope of the claims herein. One of ordinary skill in the art would recognize many other variations, alternatives, and modifications. As shown, a primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be an Ethernet controller 219, which is coupled to the North Bridge through the PCI bus. The North Bridge is coupled to the CPU. The Ethernet controller can be a 10/100 Base, such as Intel's 82559 or the like. Other types of network connection devices can also be used. For example, the invention can use Gbit Ethernet 1394, and USB 2.0. The network controller couples to a hub 233 in the console, which includes shared peripheral system 201.

Also shown is the second ACM 205. The second ACM has the same or similar components as the first ACM. Here, like reference numerals have been used for easy cross-referencing, but is not intended to be limiting. In some embodiments, the secondary ACM is not connected to the PCI bus in the peripheral console directly. The secondary ACM 219 accesses peripheral devices controlled by the primary ACM through the Ethernet connection to the primary ACM, e.g. CD-ROM, or PCI modem. The implementation is not restricted to Ethernet serial communication and can use other high-speed serial communication such as USB 2.0, and 1394. The Ethernet hub is coupled to an external output port 235, which connects to an external network.

The primary hard disk drive in each ACM can be accessed by the other ACM as sharable hard drive through the Ethernet connection. This allows the easy sharing of files between the two independent computer modules. The Ethernet Hub Controller provides the high-speed communication function between the two computer modules. Ethernet data bandwidth of 100 Mbit/sec allows fast data communication between the two computer modules. The secondary ACM access peripheral devices of the primary ACM through the network connection provided by Ethernet link. The operating system, e.g. Windows 98, provides the sharing of resources between the two ACMs. In some embodiments, critical data in one ACM can be backup into the other ACM.

The Ethernet hub also couples to PCI bus 239, which connects to PCI devices 241, 243, e.g., modem, SCSI controller. A flash memory 242 can also be coupled to the PCI bus. The flash memory can store passwords and security information, such as those implementations described in U.S. Ser. No. 09/183,493, which is commonly owned, and hereby incorporated by reference. The hub 233 also couples to an I/O control 237, which connects to keyboard/mouse switch 245, which couples to keyboard/mouse 247. Optionally, the keyboard/mouse switch also couples to a second keyboard/house 259 via PS2 or USB signal line 251. The keyboard/mouse switch has at least a first state and a second state, which allow operation of respectively multiple keyboards or a single keyboard. The switch also couples to each I/O controller 221 in each ACM via lines 253, 255. The I/O control 237 also couples to an RGB switch 257, which allows video signals to pass to the first monitor 259. Alternatively, the RGB switch couples to a second monitor 261. The RGB switch includes analog video switches such as MAXIM's MAX4545.

The peripheral system 201 also has an independent power supply 231 for each ACM. Each power supply provides power to each ACM. As merely an example, the power supply is a MICRO ATX 150 W made by ENLIGHT, but can be others. The power supply is connected or coupled to each ACM through a separate line, for example. The independent power supply allows for independent operation of each ACM in some embodiments.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 3:
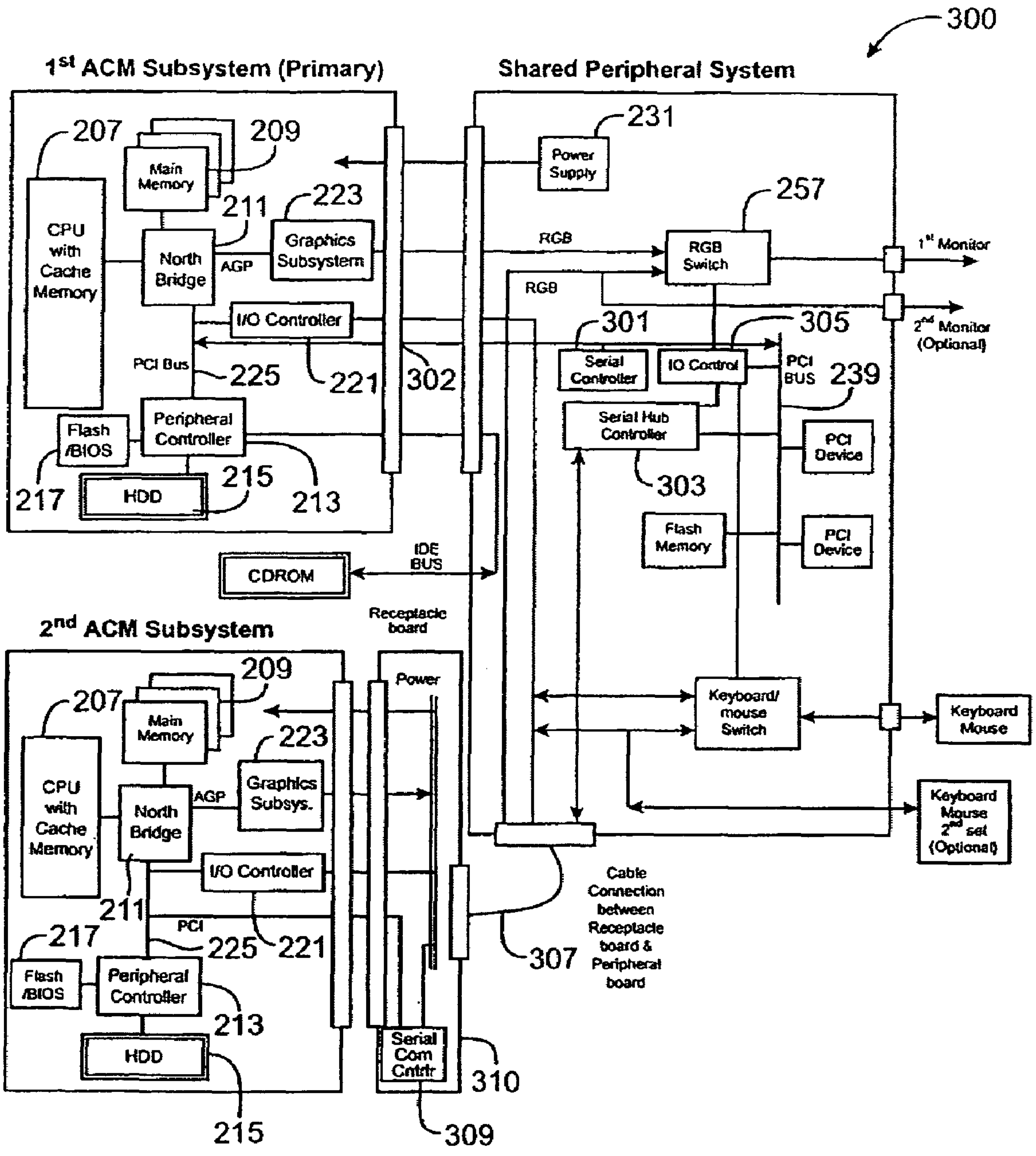
FIG. 3 is a simplified block diagram of a compeer system according to a further alternative embodiment of the present invention.

FIG. 3 is a simplified block diagram 300 of a computer system according to an alternative embodiment of the present invention. This diagram is merely an example which should not limit the scope of the claims herein. One of ordinary skill in the art would recognizes many other variations, modifications, and alternatives. Like reference numerals are used in this Fig. as the previous Figs. for easy referencing, but are not intended to be limiting. As shown, each ACM includes common elements as the previous Fig. A primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be coupled to a serial port 302, which is coupled to the PCI bus in the ACM. The serial port is coupled to the peripheral console through a serial controller 301 in the serial console. The serial controller is connected to PCI bus 239. The serial controller is also coupled to a serial hub controller 303, which is coupled to the PCI bus and a second ACM. In a specific embodiment, a receptacle board 310 is added to connect to the second ACM. The purpose of the receptacle board is to allow a cable connection 307 to the peripheral board 300. The cable connection is possible because the signals needed to connect to the peripheral board can be limited to video, I/O, serial communication, and power. The serial communication controller can be placed on the receptacle board and not in the ACM. As shown, the serial bus controller couples to the PCI bus. The receptacle board also couples to power, graphics subsystem, I/O controller, and other elements, which may be on a common bus. The overall operation of the present configuration is similar to the previous one except it operates in serial communication mode.

The Dual ACM system can support different usage models:

1. One user using both ACMs concurrently with 1 or 2 monitors, and a common keyboard/mouse.
2. Two users using the two separate ACMs at the same time with separate monitors and keyboard/mouse. The 2 users share peripherals, e.g., printer, CDROM, and others. The two users share external networking.

To support 1 monitor for both ACMs, a video switch in the peripheral console is used to switch between the video outputs of the two ACMs. The system can be set to support either 1 monitor or 2-monitor mode. The user presses a special key on the keyboard or a special icon on the screen to switch the screen display from one ACM to the other. This same action causes the keyboard and mouse connections to switch from one ACM to the other ACM.

A dual ACM system can save space, wiring, and cost for a 2-person PC setup, with the added benefit that both PC systems can be accessed from one user site for increased system performance if the other user is not using the system. Files can be copied between the primary drive of both system and provides protection against a single ACM failure. Software needs to be developed to manage the concurrent use of two PC subsystems, the automatic sharing of selected files between the two systems, and fault tolerance.

The design with more than two computer modules can be implemented with the use of multi-port, serial communication hub controller and multi-port I/O switches. In one embodiment, a peripheral console has four computer bays for four separate computer modules. The computer modules communicate through a four port Ethernet hub. The video, keyboard, and mouse switch will cycle through the connection from each computer module to the external monitor, keyboard, and mouse with a push button sequentially. This embodiment is useful for a server that performs different functions concurrently, e.g. email, application hosting, web hosting, firewall, etc.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 4:
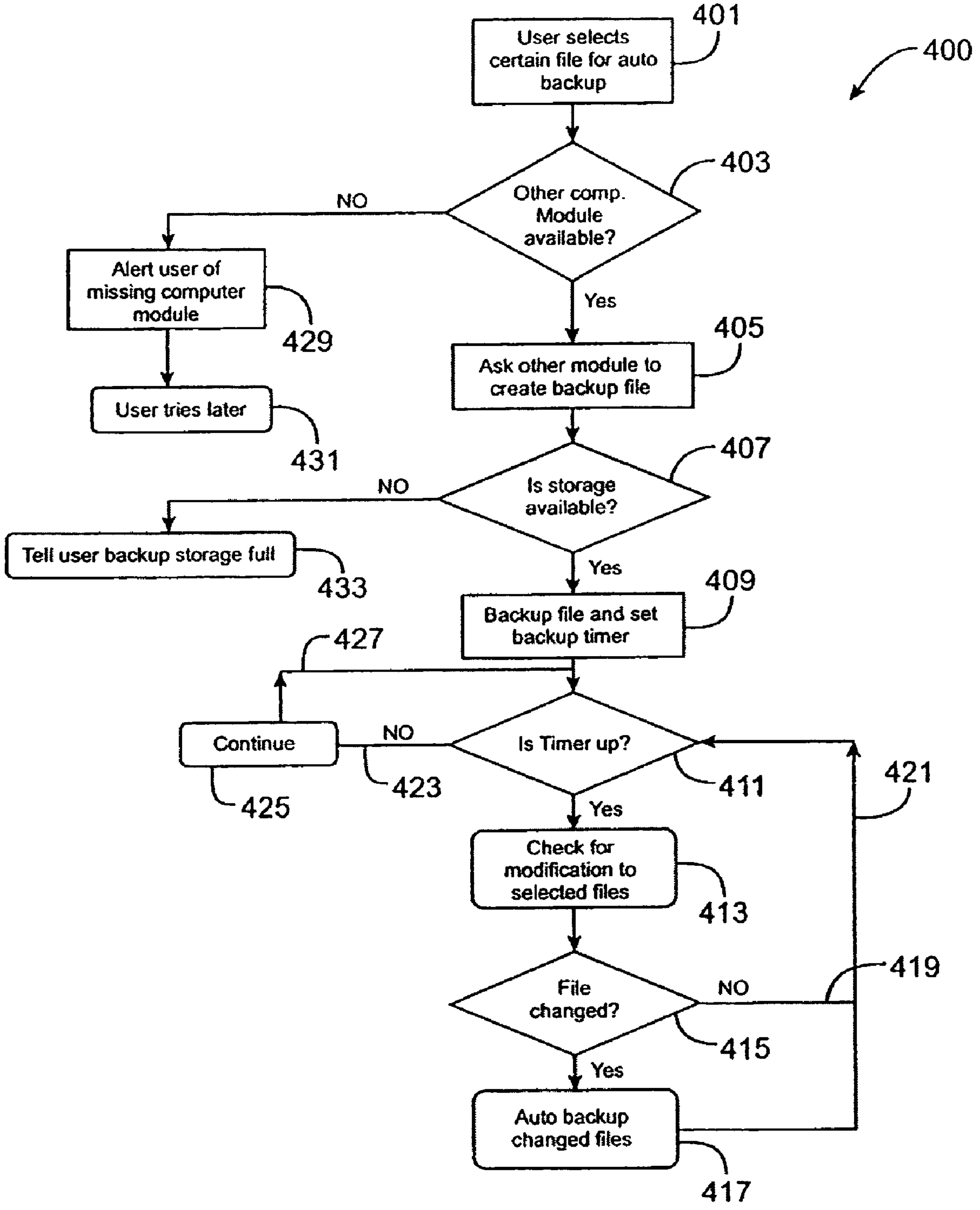
FIG. 4 is a simplified flow diagram of a method according to an embodiment of the present invention.
Figure 5:
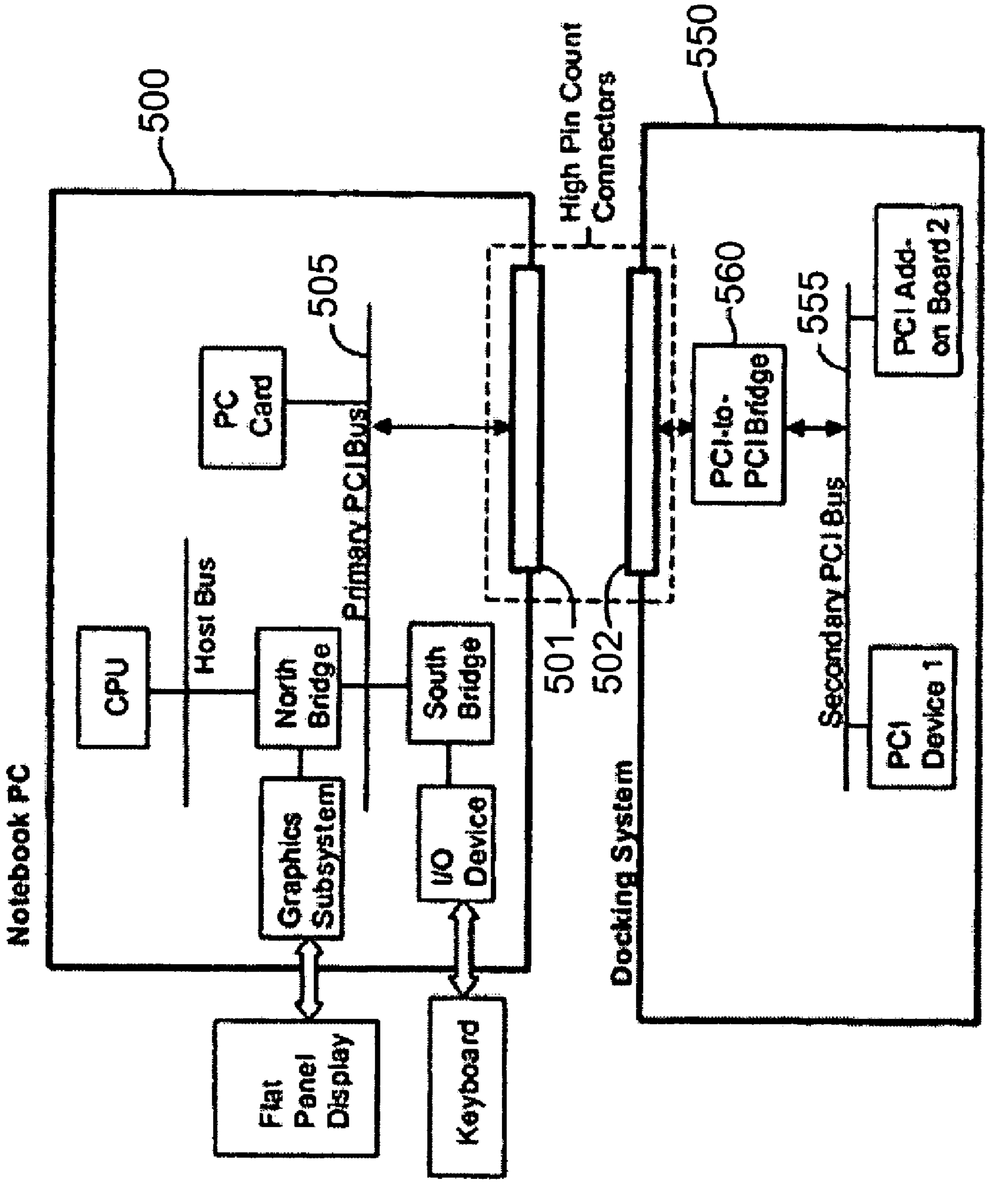
FIG. 5 is a block diagram of a computer system using a prior art interface between a primary and a secondary PCI bus.

FIG. 4 is a simplified diagram of a method according to an embodiment of the present invention. This diagram is merely an example which should not limit the scope of the claims herein. One of ordinary skill in the art would recognize many other variations, modifications, and alternatives. The present diagram illustrates an automatic file backup procedure from one computer module to the other. As shown, a user selects (step 401) a certain file in one of the computer module for automatic backup. Next, the method determines if another module is available, step 403. If so, the method in the originating module requests the other computer module to create (step 405) backup file. Alternatively, the method alerts the user of the missing or malfunctioning module, step 429. The method then has the user try later 431, once the missing or malfunctioning module has been replaced or repaired. Next, the method determines if there is sufficient storage available in the other computer module for the backup files. If so, the method goes to the next step. (Alternatively, the method prompts (step 433) a message to the user indicating that the storage is full.) In the next step, the method stores the backup file in memory of the other module. After the backup file has been successfully created (step 409), the software in the originating ACM sets a timer to check (step 411) for file modification via branches 423, 427 through continue, step 425 process. If a file selected for backup has been modified (step 415), then the file is automatically back up to the other ACM again, step 417. Alternatively, the method returns to step 411 through branch 421.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 6:
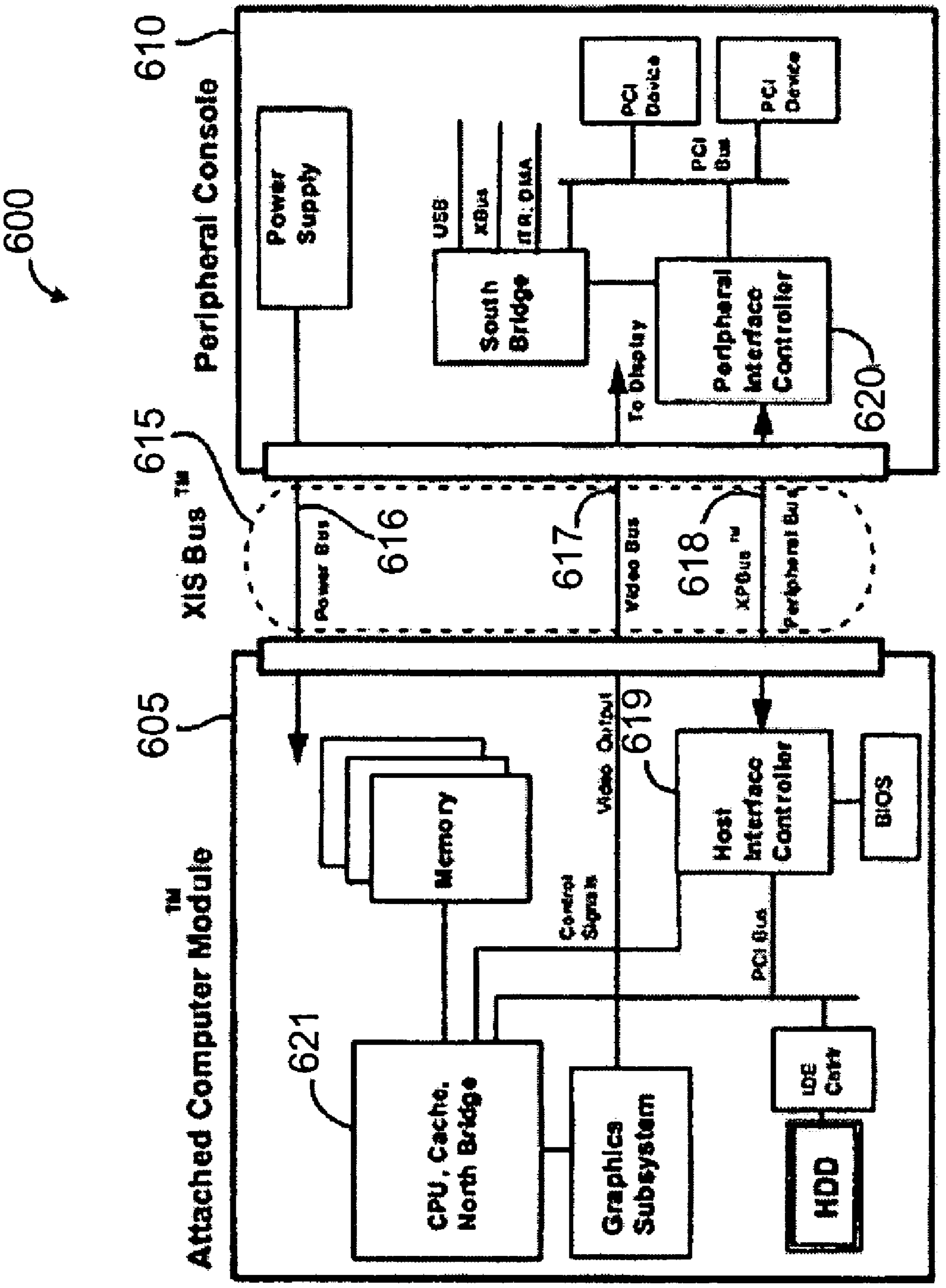
FIG. 6 is a block diagram of one embodiment of a computer system using the interface of the present invention.

FIG. 6 is a block diagram of one embodiment of a computer system 600 using the interface of the present invention. Computer system 600 includes an attached computer module (ACM) 605 and a peripheral console 610, which are described in greater detail in the application of William W. Y. Chu for "Personal Computer Peripheral Console With Attached Computer Module" filed concurrently with the present application on Sep. 8, 1998 and incorporated herein by reference. The ACM 605 and the peripheral console 610 are interfaced through an exchange interface system (XIS) bus 615. The XIS bus 615 includes power bus 616, video bus 617 and peripheral bus (XPBus) 618, which is also herein referred to as an interface channel. The power bus 616 transmits power between ACM 605 and peripheral console 610. In a preferred embodiment power bus 616 transmits power at voltage levels of 3.3 volts, 5 volts and 12 volts. Video bus 617 transmits video signals between the ACM 605 and the peripheral console 610. In a preferred embodiment, the video bus 617 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 618 is coupled to host interface controller (HIC) 619 and to peripheral interface controller (PIC) 620, which is also sometimes referred to as a bay interface controller.

Figure 7:
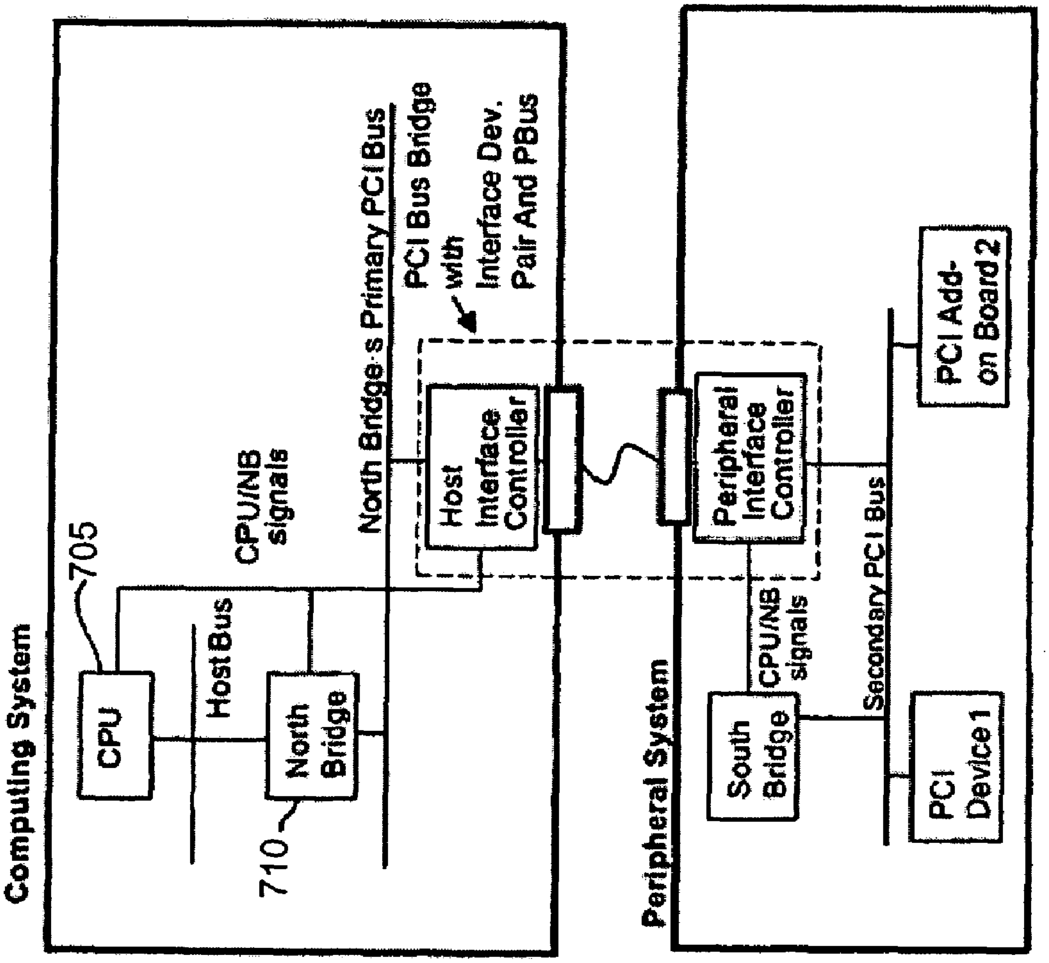
FIG. 7 is a partial block diagram of a computer system using the interface of the present invention as a bridge between the north and south bridges of the computer system.
Figure 8:
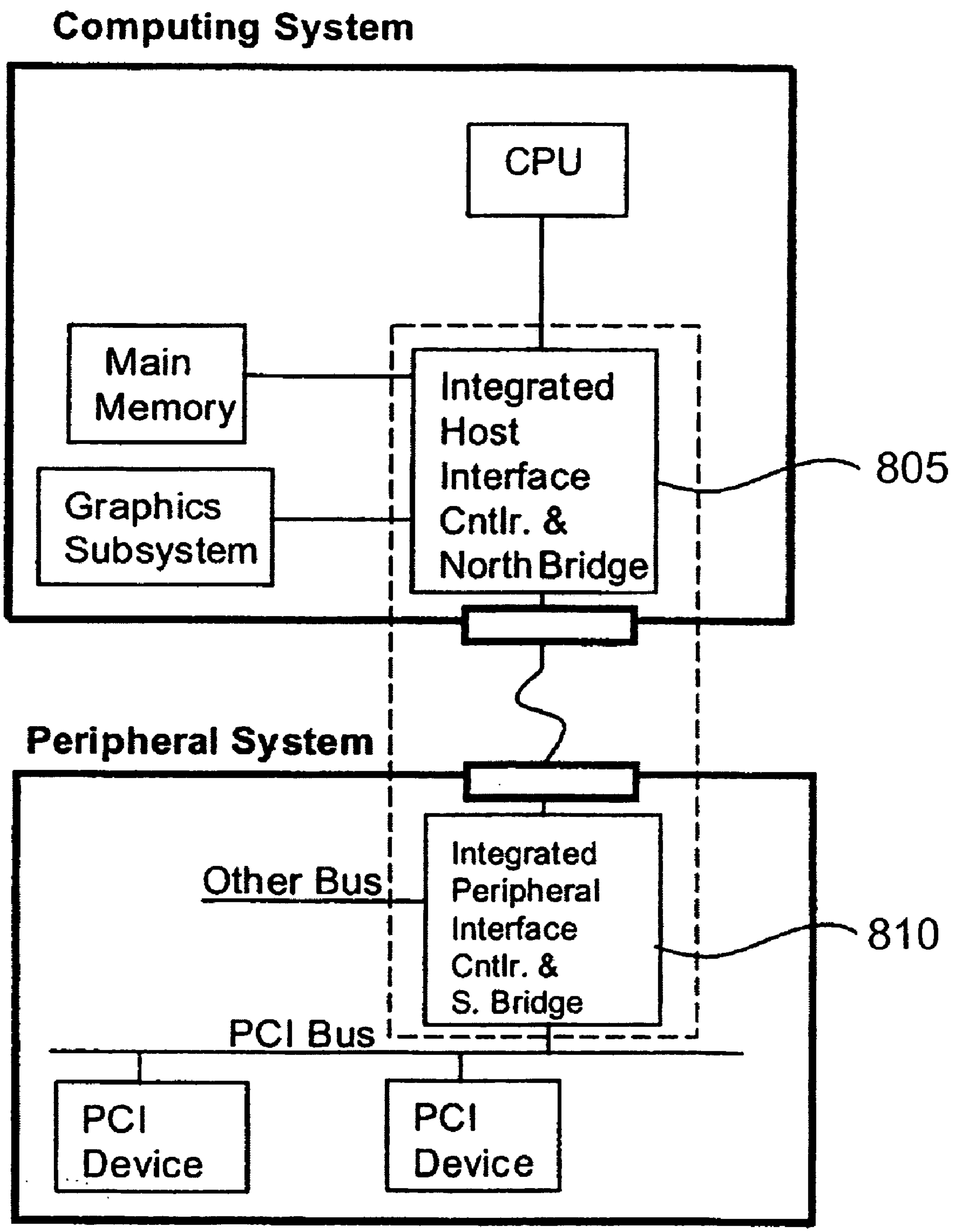
FIG. 8 is a partial block diagram of a computer system in which the north and south bridges are integrated with the host and peripheral interface controllers, respectively.

In the embodiment shown in FIG. 6, HIC 619 is coupled to an integrated unit 621 that includes a CPU, a cache and a north bridge. In another embodiment, such as that shown in FIG. 7, the CPU 705 and north bridge 710 are separate rather than integrated units. In yet another embodiment, such as that shown in FIG. 8, the HIC and PIC are integrated with the north and south bridges, respectively, such that integrated HIC and north bridge unit 805 includes an HIC and a north bridge, while integrated PIC and south bridge unit 810 includes a PIC and a south bridge.

Figure 9:
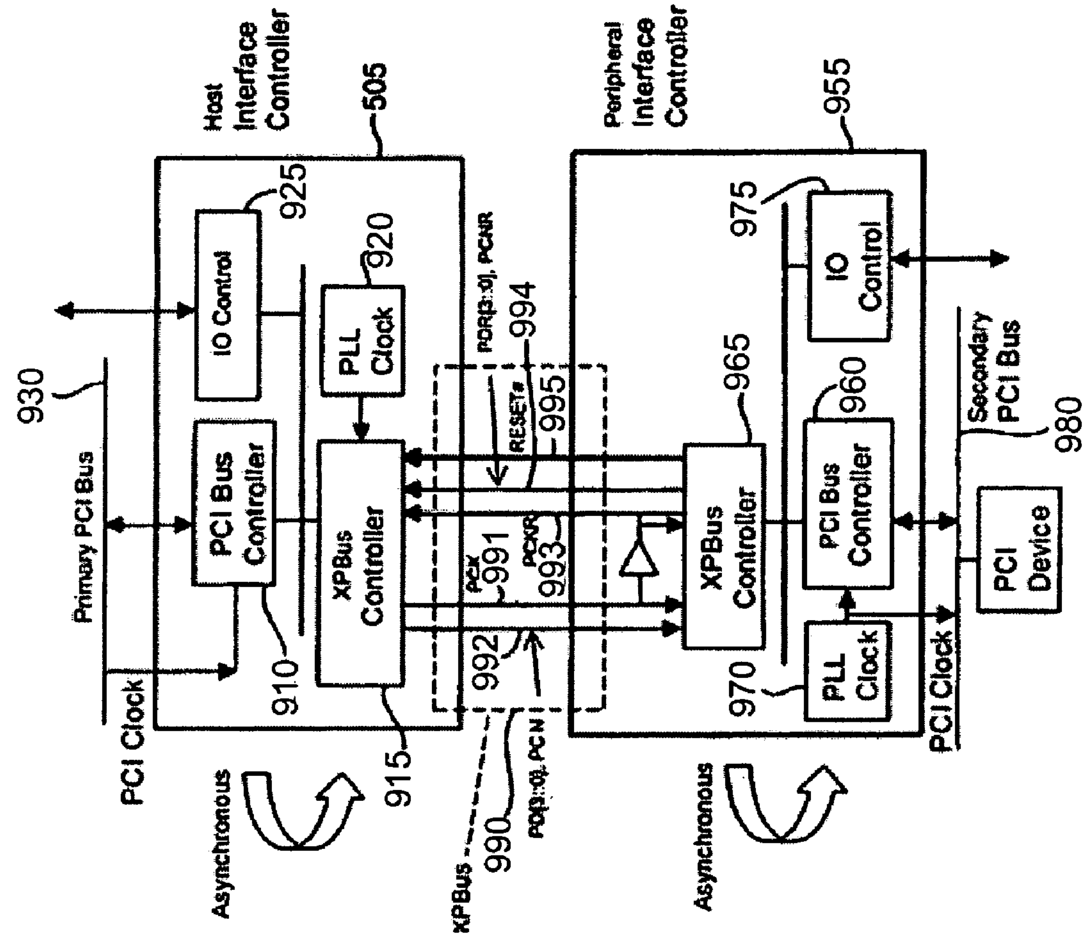
FIG. 9 is a block diagram of one embodiment of the host interface controller and the peripheral interface controller of the present invention.

FIG. 9 is a more detailed block diagram of one embodiment of an HIC 905 and a PIC 955 of the present invention. HIC 905 includes a peripheral component interconnect (PCI) bus controller 910, an XPBus controller 915, a phase lock loop (PLL) clock 920 and an input/output (10) control 925. Similarly, PIC 955 includes a PCI bus controller 960, an XPBus controller 965, a PLL clock 970 and an IO control 975. PCI bus controllers 910 and 960 are coupled to the primary and secondary PCI buses 930 and 980, respectively, and manage PCI transactions on the primary and secondary PCI buses 930 and 980, respectively. Similarly, XPBus Controllers 915 and 965 are coupled to XPBus 990. XPBus controller 915 drives the PCK line 991 and PD[0::3] and PCN lines 992 while XPBus controller 965 drives the PCKR lines 993, the PDR[0::3] and PCNR lines 994 and the RESET# line 995.

PCI bus controller 910 receives PCI clock signals from the primary PCI bus 930 and is synchronized to the PCI clock. However, as indicated in FIG. 9, the XPBus controller 915 is asynchronous with the PCI bus controller 910. Instead, the XPBus controller receives a clock signal from the PLL clock 920 and is synchronized therewith. PLL clock 920 generates a clock signal independent of the PCI clock. The asynchronous operation of the PCI bus and the XPBus allows the PCI Bus to change in frequency, for example as in a power down situation, without directly affecting the XPBus clocking. In the embodiment shown in FIG. 9, the PLL clock 920 generates a clock signal having a frequency of 66 MHz, which is twice as large as the 33 MHz frequency of the PCI clock. (The clock signal generated by the PLL clock may have a clock speed different from, including lower than, 66 MHz. For example, in another embodiment, which is discussed in greater detail below, the PLL clock 920 generates a clock signal having a frequency of 132 MHz.)

The XPBus 990 operates at the clock speed generated by the PLL clock 920. Therefore, PCK, the clock signal from the XPBus controller 915 to XPBus controller 965 has the same frequency as the clock signal generated by PLL clock 920. XPBus controller 965 receives the PCK signal after it has been buffered and operates at the clock speed of PCK. The buffered version of the clock signal PCK is used to generate the clock signal PCKR, the clock signal form the XPBus controller 965 to XPBus controller 915. Accordingly, PCKR also has the same frequency as that generated by the PLL clock 920. The synchronous operation of PCK and PCKR provides for improved reliability in the system. In another embodiment, PCKR may be generated independently of PCK and may have a frequency different from that of PCK. It is to be noted that even when PCKR is generated from PCK, the slew between PCK and PCKR cannot be guaranteed because of the unknown cable length used for the XPBus. For a cable that is several feet long, the cable propagation delay alone can be several nano seconds.

As indicated in FIG. 9, PLL clock 970 is asynchronous with the XPBus controller 965. Instead, PLL clock 970 independently generates a clock signal that is used as a PCI clock signal on the secondary PCI bus 980. The secondary PCI bus 980 operates at the same clock speed as the primary PCI bus 930, namely at a frequency of 33 MHz.

Figure 10:
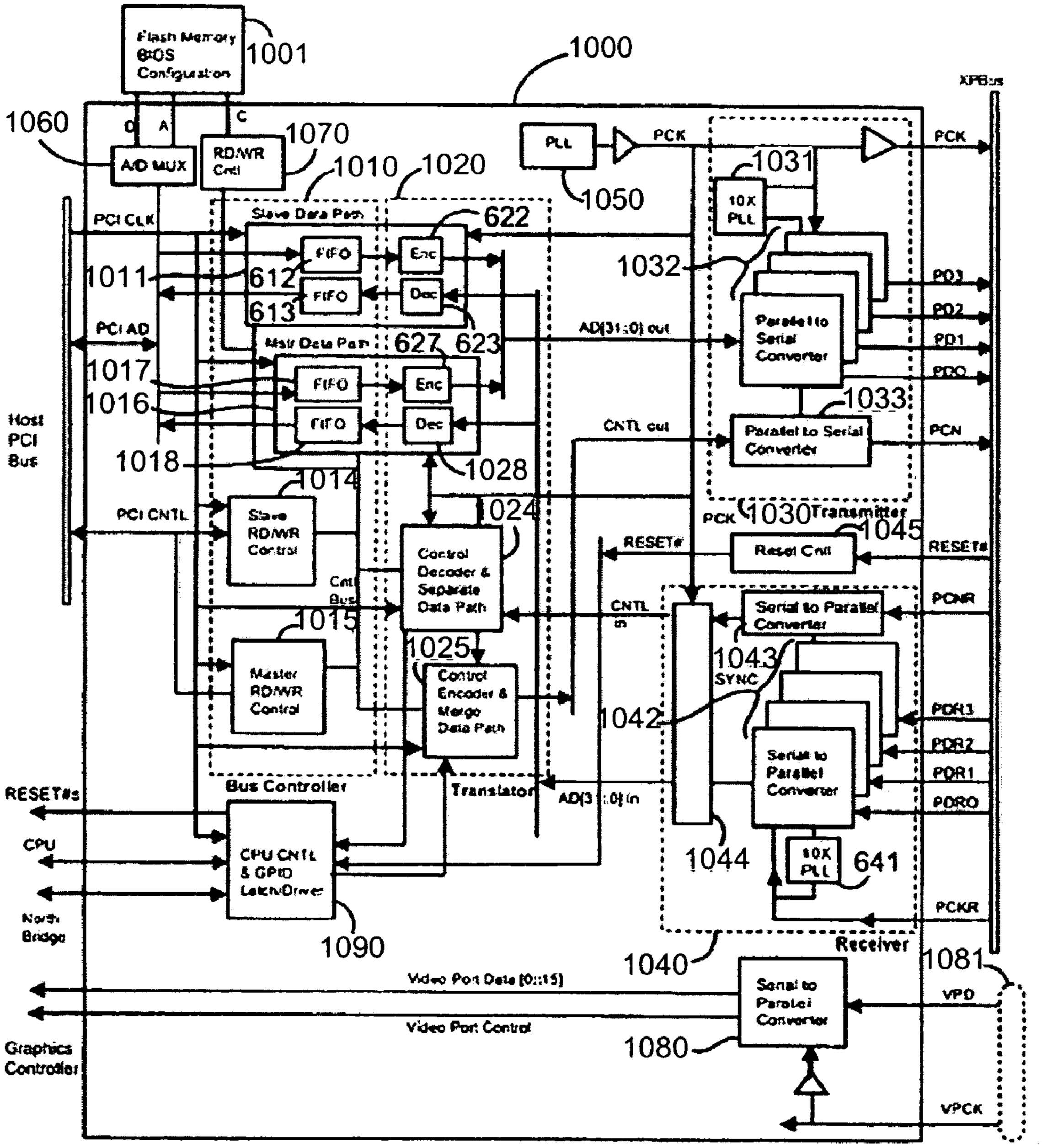
FIG. 10 is a detailed block diagram of one embodiment of the host interface controller of the present invention.

FIG. 10 is a detailed block diagram of one embodiment of the HIC of the present invention. As shown in FIG. 10, HIC 1000 comprises bus controller 1010, translator 1020, transmitter 1030, receiver 1040, a PLL 1050, an address/data multiplexer (A/D MUX) 1060, a read/write controller (RD/WR Cntl) 1070, a video serial to parallel converter 1080 and a CPU control & general purpose input/output latch/driver (CPU CNTL & GPIO latch/driver) 1090.

HIC 1000 is coupled to an optional flash memory BIOS configuration unit 1001. Flash memory unit 1001 stores basic input output system (BIOS) and PCI configuration information and supplies the BIOS and PCI configuration information to A/D MUX 1060 and RD/WR Control 1070, which control the programming, read, and write of flash memory unit 1001.

Bus controller 1010 is coupled to the host PCI bus, which is also referred to herein as the primary PCI bus, and manages PCI bus transactions on the host PCI bus. Bus controller 1010 includes a slave (target) unit 1011 and a master unit 1016. Both slave unit 1011 and master unit 1016 each include two first in first out (FIFO) buffers, which are preferably asynchronous with respect to each other since the input and output of the two FIFOs in the master unit 1016 as well as the two FIFOs in the slave unit 1011 are clocked by different clocks, namely the PCI clock and the PCK. Additionally, slave unit 1011 includes encoder 1022 and decoder 1023, while master unit 1016 includes encoder 1027 and decoder 1028. The FIFOs 1012, 1013, 1017 and 1018 manage data transfers between the host PCI bus and the XPBus, which in the embodiment shown in FIG. 10 operate at 33 MHz and 106 MHz, respectively. PCI address/data (AD) from the host PCI bus is entered into FIFOs 1012 and 1017 before they are encoded by encoders 1022 and 1023. Encoders 1022 and 1023 format the PCI address/data bits to a form more suitable for parallel to serial conversion prior to transmittal on the XPBus. Similarly, address and data information from the receivers is decoded by decoders 1023 and 1028 to a form more suitable for transmission on the host PCI bus. Thereafter the decoded data and address information is passed through FIFOs 1013 and 1018 prior to being transferred to the host PCI bus. FIFOs 1012, 1013, 1017 and 1018, allow bus controller 1010 to handle posted and delayed PCI transactions and to provide deep buffering to store PCI transactions.

Bus controller 1010 also comprises slave read/write control (RD/WR Cntl) 1014 and master read/write control (RD/WR Cntl) 1015. RD/WR controls 1014 and 1015 are involved in the transfer of PCI control signals between bus controller 1010 and the host PCI bus.

Bus controller 1010 is coupled to translator 1020. Translator 1020 comprises encoders 1022 and 1027, decoders 1023 and 1028, control decoder & separate data path unit 1024 and control encoder & merge data path unit 1025. As discussed above encoders 1022 and 1027 are part of slave data unit 1011 and master data unit 1016, respectively, receive PCI address and data information from FIFOs 1012 and 1017, respectively, and encode the PCI address and data information into a form more suitable for parallel to serial conversion prior to transmittal on the XPBus. Similarly, decoders 1023 and 1028 are part of slave data unit 1011 and master data unit 1016, respectively, and format address and data information from receiver 1040 into a form more suitable for transmission on the host PCI bus. Control encoder & merge data path unit 1025 receives PCI control signals from the slave RD/WR control 1014 and master RD/WR control 1015. Additionally, control encoder & merge data path unit 1025 receives control signals from CPU CNTL & GPIO latch/driver 1090, which is coupled to the CPU and north bridge (not shown in FIG. 10). Control encoder & merge data path unit 1025 encodes PCI control signals as well as CPU control signals and north bridge signals into control bits, merges these encoded control bits and transmits the merged control bits to transmitter 1030, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 1024 receives control bits from receiver 1040 which receives control bits on data lines PDR0 to PDR3 and control line PCNR of the XPBus. Control decoder & separate data path unit 1024 separates the control bits it receives from receiver 1040 into PCI control signals, CPU control signals and north bridge signals, and decodes the control bits into PCI control signals, CPU control signals, and north bridge signals all of which meet the relevant timing constraints.

Transmitter 1030 receives multiplexed parallel address/data (A/D) bits and control bits from translator 1020 on the AD[31::0] out and the CNTL out lines, respectively. Transmitter 1030 also receives a clock signal from PLL 1050. PLL 1050 takes a reference input clock and generates PCK that drives the XPBus. PCK is asynchronous with the PCI clock signal and operates at 106 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 106 MHz rather than 33 MHz or having 104 rather than 32 multiplexed address/data lines.

The multiplexed parallel A/D bits and some control bits input to transmitter 1030 are serialized by parallel to serial converters 1032 of transmitter 1030 into 10 bit packets. These bit packets are then output on data lines PD0 to PD3 of the XPBus. Other control bits are serialized by parallel to serial converter 1033 into 10 bit packets and send out on control line PCN of the XPBus.

A 10× multiplier 1031 receives PCK, multiplies it by a factor of 10 and feeds a clock signal 10 times greater than PCK into the parallel to serial converters 1032 and 1033. The parallel to serial converters 1032 and 1033 perform bit shifting at 10 times the PCK rate to serialize the parallel bits into 10 bit packets. As the parallel to serial converters 1032 and 1033 shift bits at 10 times the PCK rate, the bit rate for the serial bits output by the parallel to serial converters is 10 times higher than PCK rate, i.e., 1060 MHz. However, the rate at which data packets are transmitted on the XPBus is the same as the PCK rate, i.e., 106 MHz. As the PCI buses operate at a clock and bit rate of 33 MHz, the XPBus has a clock rate that is twice as large and a bit rate per bit line (channel) that is 100 times as large as that of the PCI buses which it interfaces.

Receiver 1040 receives serial bit packets on data lines PDR0 to PDR3 and control line PCNR. Receiver 1040 also receives PCKR on the XPBus as well as the clock signal PCK from PLL 1050. The synchronizer (SYNC) 1044 of receiver 1040 synchronizes the clock signal PCKR to the locally generated clock signal, PCK, in order to capture the bits received from the XPBus into PCK clock timing.

Serial to parallel converters 1042 convert the serial bit packets received on lines PDR0 to PDR3 into parallel address/data and control bits that are sent to decoders 1023 and 1028 and control decoder and separate data path unit 1024, respectively. Serial to parallel converter 1043 receives control bit packets from control line PCNR, converts them to parallel control bits and sends the parallel control bits to control decoder & separate data path 1024.

A 10× multiplier 1041 receives PCKR, multiplies it by a factor of 10 and feeds a clock signal 10 times greater than PCKR into the serial to parallel converters 1042 and 1043. Because the bits on PDR0 to PDR3 and PCNR are transmitted at a bit rate of 10 times the PCKR rate, the serial to parallel converters 1042 and 1043 perform bit shifting at 10 times the PCKR rate to convert the 10 bit packets into parallel bits. It is to be noted that the rate at which bit packets are transmitted on the XPBus is the same as the PCKR rate, i.e., 106 MHz. The parallel data and control bits are thereafter sent to decoders 1023 and 1028 by way of the AD[3::0] in line and to control decoder & separate data path unit 1024 by way of CNTL in lines, respectively.

Reset control unit 1045 of HIC 1000 receives the signal RESET#, which is an independent system reset signal, on the reset line RESET#. Reset control unit 1045 then transmits the reset signal to the CPU CNTL & GPIO latch/driver unit 1090.

As may be noted from the above, the 32 line host and secondary PCI buses are interfaced by 10 XPBus lines (PD0, PD1, PD2, PD3, PCN, PDR0, PDR1, PDR2, PDR3, PCNR). Therefore, the interface channel, XPBus, of the present invention uses fewer lines than are contained in either of the buses which it interfaces, namely the PCI buses. XPBus is able to interface such PCI buses without backup delays because the XPBus operates at a clock rate and a per line (channel) bit rate that are higher than those of the PCI buses.

In addition to receiving a reset signal, the CPU CNTL & GPIO latch/driver 1090 is responsible for latching input signals from the CPU and north bridge and sending the signals to the translator. It also takes decoded signals from the control decoder & separate data path unit 1024 and drives the appropriate signals for the CPU and north bridge.

In the embodiment shown in FIG. 10, video serial to parallel converter 1080 is included in HIC 1000. In another embodiment, video serial to parallel converter 1080 may be a separate unit from the HIC 1000. Video serial to parallel converter 1080 receives serial video data on line VPD and a video clock signal VPCK from line VPCK of video bus 1081. It then converts the serial video data into 16 bit parallel video port data and the appropriate video port control signals, which it transmits to the graphics controller (not shown in FIG. 10) on the video port data [0::15] and video port control lines, respectively.

HIC 1000 handles the PCI bus control signals and control bits from the XPBus representing PCI control signals in the following ways:

1. HIC 1000 buffers clocked control signals from the host PCI bus, encodes them into control bits and sends the encoded control bits to the XPBus;
2. HIC 1000 manages the signal locally; and
3. HIC 1000 receives control bits from XPBus, translates the control bits into PCI control signals and sends the PCI control signals to the host PCI bus.

Figure 11:
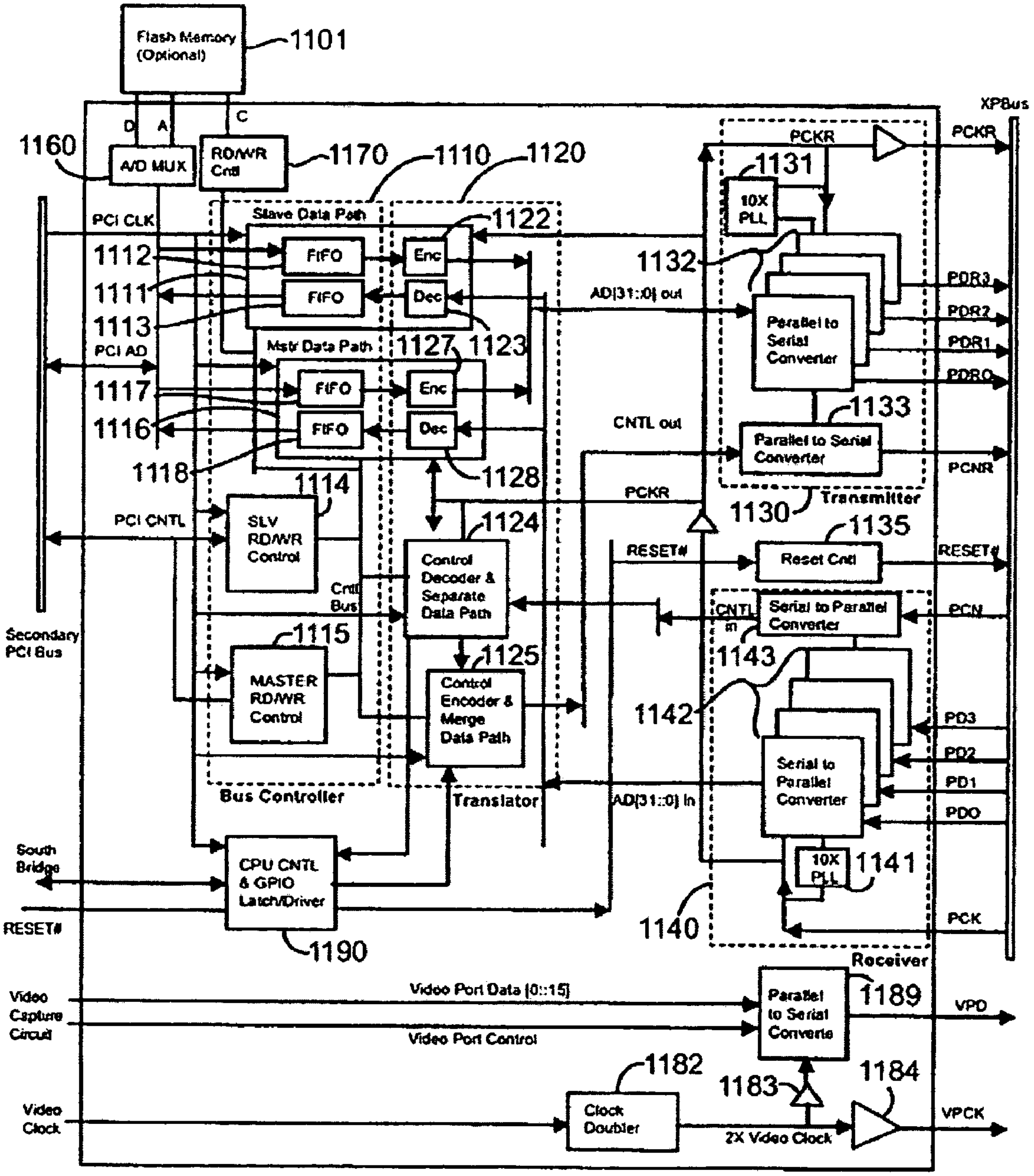
FIG. 11 is a detailed block diagram of one embodiment of the PIC of the present invention.

FIG. 11 is a detailed block diagram of one embodiment of the PIC of the present invention. PIC 1100 is nearly identical to HIC 1000 in its function, except that HIC 1000 interfaces the host PCI bus to the XPBus while PIC 1100 interfaces the secondary PCI bus to the XPBus. Similarly, the components in PIC 1100 serve the same function as their corresponding components in HIC 1000. Reference numbers for components in PIC 1100 have been selected such that a component in PIC 1100 and its corresponding component in HIC 1000 have reference numbers that differ by 500 and have the same two least significant digits. Thus for example, the bus controller in PIC 1100 is referenced as bus controller 1110 while the bus controller in HIC 1000 is referenced as bus controller 1010. As many of the elements in PIC 1100 serve the same functions as those served by their corresponding elements in HIC 1000 and as the functions of the corresponding elements in HIC 1000 have been described in detail above, the function of elements of PIC 1100 having corresponding elements in HIC 1000 will not be further described herein. Reference may be made to the above description of FIG. 10 for an understanding of the functions of the elements of PIC 1100 having corresponding elements in HIC 1000.

As suggested above, there are also differences between HIC 1000 and PIC 1100. Some of the differences between HIC 1000 and PIC 1100 include the following. First, receiver 1140 in PIC 1100, unlike receiver 1040 in HIC 1000, does not contain a synchronization unit. As mentioned above, the synchronization unit in HIC 1000 synchronizes the PCKR clock to the PCK clock locally generated by PLL 1050. PIC 1100 does not locally generate a PCK clock and therefore, it does not have a locally generated PCK clock with which to synchronize the PCK clock signal that it receives from HIC 1000. Another difference between PIC 1100 and HIC 1000 is the fact that PIC 1100 contains a video parallel to serial converter 1189 whereas HIC 1000 contains a video serial to parallel converter 1080. Video parallel to serial converter 1189 receives 16 bit parallel video capture data and video control signals on the Video Port Data [0::15] and Video Port Control lines, respectively, from the video capture circuit (not shown in FIG. 11) and converts them to a serial video data stream that is transmitted on the VPD line to the HIC. The video capture circuit may be any type of video capture circuit that outputs a 16 bit parallel video capture data and video control signals. Another difference lies in the fact that PIC 1100, unlike HIC 1000, contains a clock doubler 1182 to double the video clock rate of the video clock signal that it receives. The doubled video clock rate is fed into video parallel to serial converter 1182 through buffer 1183 and is sent to serial to parallel converter 1080 through buffer 1184. Additionally, reset control unit 1135 in PIC 1100 receives a reset signal from the CPU CNTL & GPIO latch/driver unit 1190 and transmits the reset signal on the RESET# line to the HIC 1000 whereas reset control unit 1045 of HIC 1000 receives the reset signal and forwards it to its CPU CNTL & GPIO latch/driver unit 1090 because, in the above embodiment, the reset signal RESET# is unidirectionally sent from the PIC 1100 to the HIC 1000.

Like HIC 1000, PIC 1100 handles the PCI bus control signals and control bits from the XPBus representing PCI control signals in the following ways:

1. PIC 1100 buffers clocked control signals from the secondary PCI bus, encodes them and sends the encoded control bits to the XPBus;
2. PIC 1100 manages the signal locally; and
3. PIC 1100 receives control bits from XPBus, translates them into PCI control signals and sends the PCI control signals to the secondary PCI bus.

PIC 1100 also supports a reference arbiter on the secondary PCI Bus to manage the PCI signals REQ# and GNT#.

FIG. 12 is a table showing the symbols, signals, data rate and description of signals on the XPBus, where RTN indicates a ground (GND) reference. In the above tables, P&D stands for plug and display and is a trademark of the Video Electronics Standards Association (VESA) for the Plug and Display standard, DDC2:SCL and DDC2:SDA stand for the VESA display data channel (DDC) standard 2 clock and data signals, respectively, SV stands for super video, V33 is 3.3 volts, and V5 is 5.0 volts. TMDS stands for Transition Minimized Differential Signaling and is a trademark of Silicon Images and refers to their Panel Link technology, which is in turn a trademark for their LVDS technology. TMDS is used herein to refer to the Panel Link technology or technologies compatible therewith.

FIG. 13 is a table showing the information transmitted on the XPBus during two clock cycles of the XPBus in one embodiment of the present invention where 10 data bits are transmitted in each clock cycle of the XPBus. In FIG. 13, A00 to A31 represent 32 bits of PCI address A[31::0], D00 to D31 represent 32 bits of PCI data D[31::0], BS0 to BS3 represent 4 bits of bus status data indicating the status of the XPBus, CM0# to CM3# represent 4 bits of PCI command information, BE0# to BE3# represent 4 bits of PCI byte enable information, and CN0 to CN9 represent 10 bits of control information sent in each clock cycle. As shown in FIG. 13, for each of lines PD0 to PD3, the 10 bit data packets contain one BS bit, one CM/BE bit, and eight A/D bits. For the PCN line, the 10 bit data packet contains 10 CN bits. The first clock cycle shown in FIG. 13 comprises an address cycle in which 4 BS bits, 4 CM bits, 32 A bits and 10 CN bits are sent. The second clock cycle comprises a data cycle in which 4 BS bits, 4 BE bits, 32 D bits and 10 CN bits are sent. The bits transmitted on lines PD0 to PD3 represent 32 PCI AD[31::0] signals, 4 PCI C/BE# [3::0] signals, and part of the function of PCI control signals, such as FRAME#, IRDY#, and TRDY#.

In the embodiment shown in FIG. 13, BS0 to BS3 are sent at the beginning of each clock cycle. The bus status bits indicate the following bus cycle transactions: idle, address transfer, write data transfer, read data transfer, switch XPBus direction, last data transfer, wait, and other cycles.

Bits representing signals transmitted between the CPU and South Bridge may also be sent on the lines interconnecting the HIC and PIC, such as lines PCN and PCNR. For example, CPU interface signals such as CPU interrupt (INTR), Address 20 Mask (A20M#), Non-Maskable Interrupt (NMI), System Management Interrupt (SMI#), and Stop Clock (STPCLK#), may be translated into bit information and transmitted on the XPBus between the HIC and the PIC.

Figure 14:
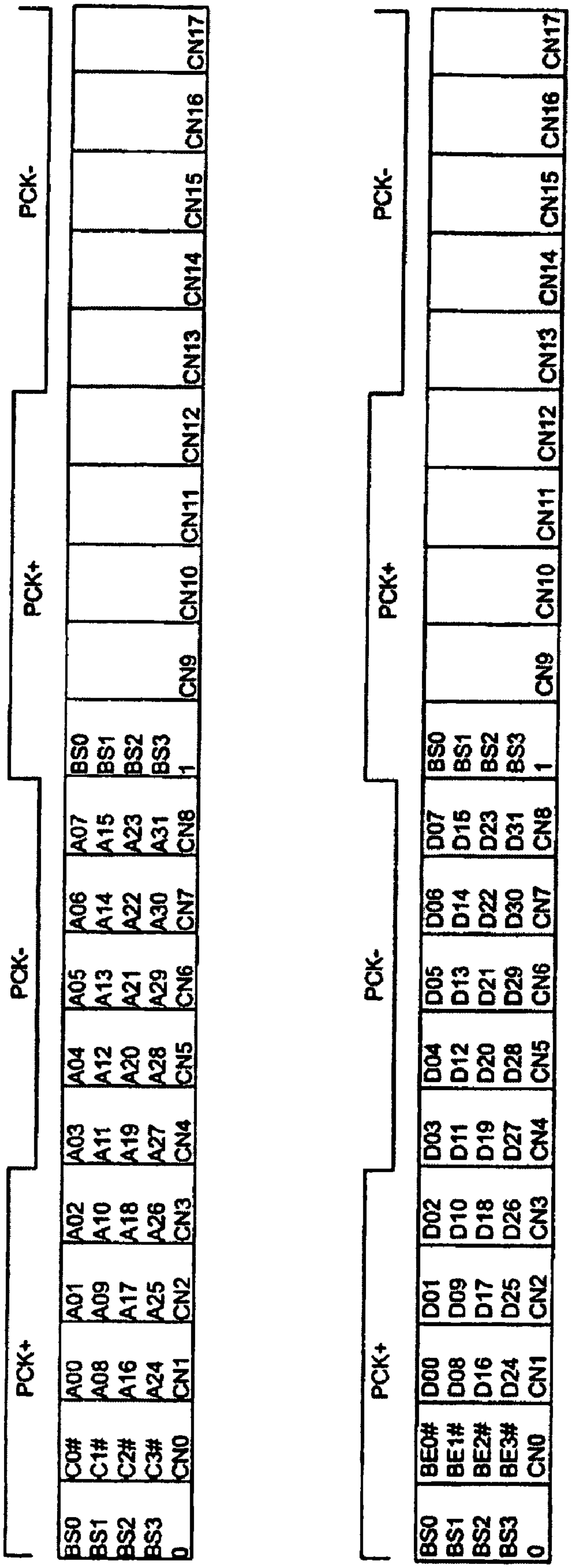
FIG. 14 is a table showing information transmitted on the XPBus during four clock cycles of the XPBus in another embodiment of the present invention where 10 data bits are transmitted in each clock cycle of the XPBus.

FIG. 14 is a table showing the information transmitted on the XPBus during four clock cycles of the XPBus in another embodiment of the present invention where 10 data bits are transmitted in each clock cycle of the XPBus. In this embodiment, the XPBus clock rate is twice as large as the PCI clock rate. This allows sending data and address bits every other XPBus cycle. As can be seen in FIG. 14, there are no address or data bits transmitted during the second or fourth XPBus clock cycle. The fact that the XPBus clock rate is higher than the PCI clock rate allows for compatibility of the XPBus with possible future expansions in the performance of PCI bus to higher data transfer and clock rates.

In the embodiment shown in FIG. 14, there are 18 control bits, CN0 to CN17, transmitted in every two XPBus clock cycles. The first bit transmitted on the control line in each XPBus clock cycle indicates whether control bits CN0 to CN8 or control bits CN9 to CN17 will be transmitted in that cycle. A zero sent at the beginning of a cycle on the control line indicates that CN0 to CN8 will be transmitted during that cycle, whereas a one sent at the beginning of a cycle on the control line indicates that CN9 to CN17 will be transmitted during that cycle. These bits also indicate the presence or absence of data and address bits during that cycle. A zero indicates that address or data bits will be transmitted during that cycle whereas a one indicates that no address or data bits will be transmitted during that cycle.

In one embodiment, BS0 and BS1 are used to encode the PCI signals FRAME# and IRDY#, respectively. Additionally, in one embodiment, BS2 and BS3 are used to indicate the clock speed of the computer bus interface and the type of computer bus interface, respectively. For example, BS2 value of zero may indicate that a 33 MHz PCI bus of 32 bits is used whereas a BS2 value of one may indicate that a 66 MHz PCI bus of 32 bits is used. Similarly, a BS3 value of zero may indicated that a PCI bus is used whereas a BS3 value of one may indicated that another computer interface bus, such as an Institute of Electronics & Electrical Engineers (IEEE) 1394 bus, is used.

Figure 15:
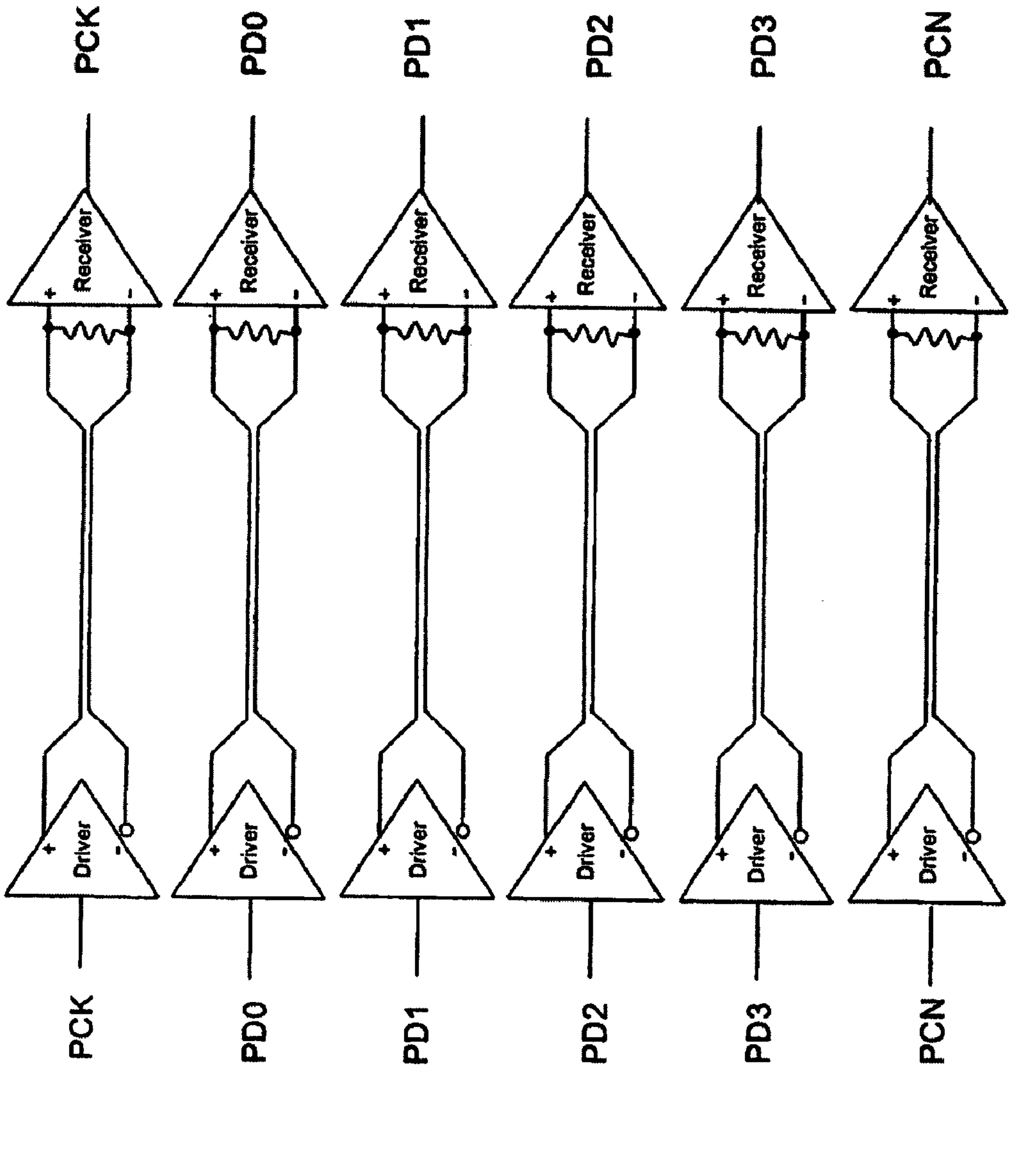
FIG. 15 is a schematic diagram of the signal lines PCK, PD0 to PD3, and PCN.

FIG. 15 is a schematic diagram of lines PCK, PD0 to PD3, and PCN. These lines are unidirectional LVDS lines for transmitting clock signals and bits such as those shown in FIGS. 13 and 14 from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 15, except that they transmit data in a direction opposite to that in which the lines shown in FIG. 15 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.

The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.

The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.

It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 23, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.

A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.

FIG. 16 is a table showing the names, types, number of pins dedicated to, and the description of the primary bus PCI signals. The pins represent those between the host PCI bus and the HIC.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer system comprising:

a console comprising a power supply, a first coupling site and a second coupling site, each coupling site comprising a connector and a slot, the console being an enclosure housing the coupling sites, a serial communication controller powered by the power supply, and a plurality of computer modules; each computer module coupled to one of the coupling site through the connector and the slot, comprising an enclosure, a processing unit, a main memory coupled to the processing unit, a graphics controller, and wherein each of the computer modules is substantially similar in design to each other and operates fully independent of each other; and wherein the computer module communicates through the connector with the serial communication controller through two sets of unidirectional serial, differential signal channels which transmit data in opposite directions.

2. The computer system of claim 1 wherein each computer module further comprises a communication controller coupled to the serial communication controller in the console adapted to transfer data between any two of the computer modules and to an external network.

3. The computer system of claim 1 further comprises a hard disk drive coupled to the computer module.

4. The computer system of claim 1 wherein the computer module further comprises an interface controller coupled to a differential signal channel for communicating an encoded serial bit stream of Peripheral Component Interconnect (PCI) bus transaction.

5. The computer system of claim 4 wherein the serial bit stream of PCI bus transaction comprises encoded PCI address and data bits.

6. A computer system comprising:

a console comprising a power supply, a first coupling site and a second coupling site, each coupling site comprising a connector and a slot, the console being an enclosure housing the coupling sites, an Ethernet controller coupled to an external network and powered by the power supply, and a plurality of computer modules; each computer module coupled to one of the coupling site through the connector and the slot, comprising a processing unit, a main memory coupled to the processing unit, an interface controller coupled to a differential signal channel for communicating an encoded serial bit stream of Peripheral Component Interconnect (PCI) bus transaction, and a network controller coupled to the Ethernet controller through the connector of the coupling site, wherein each of the computer modules is substantially similar in design to each other, and wherein one of the computer modules is configured to provide protection against failure of another of the computer modules.

7. The computer system of claim 6 wherein the differential signal channel comprises two sets of unidirectional serial bit channels which transmit data in opposite directions.

8. The computer system of claim 6 wherein the encoded serial bit stream comprises 10 bit packets.

9. The computer system of claim 6 wherein the serial bit stream of PCI bus transaction comprises encoded PCI address and data bits.

10. The computer system of claim 6 wherein the Ethernet controller adapted to transfer data between any two of the computer modules and to the external network.

11. A computer system comprising:

a console comprising an Ethernet hub controller, a first coupling site and a second coupling site, each coupling site comprising a connector and a slot, the console being a first enclosure housing the Ethernet hub controller, each coupling site, and a plurality of computer modules, each coupled to one of the coupling sites through the connector and the slot; each computer module comprising a processing unit, a main memory coupled to the processing unit, an interface controller coupled to a differential signal channel for communicating an encoded serial bit stream of Peripheral Component Interconnect (PCI) bus transaction, and an Ethernet controller coupled to the Ethernet hub controller through the connector of the coupling site for communication between the computer modules;

and wherein each of the computer modules operates fully independent of each other.

12. The computer system of claim 11 wherein the differential signal channel comprises two sets of unidirectional serial bit channels which transmit data in opposite directions.

13. The computer system of claim 11 wherein the computer module further comprises a second enclosure and a hard disk drive wherein the second enclosure houses the hard disk drive.

14. The computer system of claim 11 wherein the serial bit stream of PCI bus transaction comprises encoded PCI address and data bits.

15. A computer system comprising:

a console comprising a power supply, a first coupling site and a second coupling site, each coupling site comprising a connector and a slot, the console being a first enclosure housing the coupling sites, a serial communication controller powered by the power supply, and a plurality of computer modules; each computer module coupled to one of the coupling site through the connector and the slot, comprising a processing unit, a main memory coupled to the processing unit, a communication controller coupled to the serial communication controller through the connector of the coupling site communicating with two sets of unidirectional serial, differential signal channels which transmit data in opposite directions, and an interface controller coupled to a differential signal channel for communicating encoded serial bit stream of Peripheral Component Interconnect (PCI) bus transaction;

wherein each of the computer modules operates fully independent of each other.

16. The computer system of claim 15 wherein the encoded serial bit stream comprises 10 bit packets.

17. The computer system of claim 15 wherein the interface controller couples to a flash memory with PCI configuration information.

18. The computer system of claim 15 wherein the computer module further comprises a second enclosure and a hard disk drive wherein the second enclosure houses the hard disk drive.

19. The computer system of claim 15 wherein the serial bit stream of PCI bus transaction comprises encoded PCI address and data bits.

20. A computer system comprising:

a console comprising a video switch, a first coupling site and a second coupling site, each coupling site comprising a connector and a slot; the console being an enclosure housing the video switch, each coupling site, an Ethernet controller coupled to an external network, and a plurality of computer modules; each computer module coupled to one of the coupling sites through the connector and the slot, and comprising an enclosure, a processing unit, a main memory coupled to the processing unit, a graphics controller coupled to the video switch, and an interface controller coupled to a differential signal channel of two unidirectional serial bit streams which transmit data in opposite directions;

wherein each of the computer modules operates fully independent of each other; and wherein one of the computer modules can replace another one of the computer modules in operation.

21. The computer system of claim 20 wherein the interface controller couples to a flash memory with PCI configuration information.

22. The computer system of claim 20 further comprises a hard disk drive coupled to the computer module.

23. The computer system of claim 20 wherein the serial bit stream comprises 10 bit packets.

24. The computer system of claim 20 wherein the serial bit stream comprises PCI bus transaction with encoded PCI address and data bits.

25. A computer system comprising:

a console comprising an Ethernet hub controller, a first coupling site and a second coupling site, each coupling site comprising a connector and a slot, the console being an enclosure housing the Ethernet hub controller, each coupling site, and a plurality of computer modules, each coupled to one of the coupling sites through the connector and the slot; each computer module comprising a processing unit, a main memory coupled to the processing unit, a hard disk drive, an interface controller coupled to a differential signal channel for communicating encoded serial bit stream of Peripheral Component Interconnect (PCI) bus transaction, and an Ethernet controller coupled to the Ethernet hub controller through the connector of the coupling site for communication between the computer modules;

wherein each of the computer modules operates independent of each other, and wherein one of the computer modules can replace another one of the computer modules in operation.

26. The computer system of claim 25 wherein the interface controller couples to a flash memory with PCI configuration information.

27. The computer system of claim 25 wherein the hard disk drive is removable while the computer module is in operation.

28. The computer system of claim 25 wherein the differential signal channel comprises two sets of unidirectional serial bit channels which transmit data in opposite directions.

29. The computer system of claim 25 wherein the serial bit stream of PCI bus transaction comprises encoded PCI address and data bits.

30. A computer system comprising:

a console comprising a first coupling site, and a second coupling site, each coupling site comprising a connector and a slot; the console being an enclosure housing each coupling site, an Ethernet hub controller, and a plurality of computer modules; each computer module coupled to the coupling site through the connector and the slot, and comprising a processing unit, a main memory coupled to the processing unit, a graphics controller, an interface controller coupled to a differential signal channel for communicating an encoded serial bit stream of Peripheral Component Interconnect (PCI) bus transaction, an Ethernet controller coupled to the Ethernet hub controller through the connector of the coupling site for communication between the computer modules, and a SCSI hard disk drive;

wherein each of the computer modules is substantially similar in design to each other, and wherein one of the computer modules can provide protection against failure of another one of the computer modules.

31. The computer system of claim 30 wherein the encoded serial bit stream comprises 10 bit packets.

32. The computer system of claim 30 wherein the SCSI hard disk drive is removable while the computer module is in operation.

33. The computer system of claim 30 wherein the interface controller couples to a flash memory with PCI configuration information.

34. The computer system of claim 30 wherein the serial bit stream of PCI bus transaction comprises encoded PCI address and data bits.

35. A computer system comprising:

a console comprising an Ethernet controller coupled to an external network, a keyboard/mouse multi-port switch, a first coupling site and a second coupling site, each coupling site comprising a connector and a slot, the console being an enclosure housing the Ethernet controller, each coupling site, and a plurality of computer modules, each coupled to one of the coupling sites through the connector and the slot; each computer module comprising a processing unit, a main memory coupled to the processing unit, an interface controller coupled to a differential signal channel for communicating encoded serial bit stream of Peripheral Component Interconnect (PCI) bus transaction, and a network controller coupled to the Ethernet controller through the connector of the coupling site for communication between the computer modules;

wherein each of the computer modules operates fully independent of each other; and wherein the keyboard/mouse multi-port switch switches between keyboard/mouse connection of the computer modules based on a command from a user.

36. The computer system of claim 35 wherein the differential signal channel comprises two sets of unidirectional serial bit channels which transmit data in opposite directions.

37. The computer system of claim 35 wherein the interface controller couples to a flash memory with PCI configuration information.

38. The computer system of claim 35 wherein the serial bit stream of PCI bus transaction comprises encoded PCI address and data bits.

39. The computer system of claim 35 wherein the command from the user is in the form of either a key on the keyboard or an icon on the screen that the mouse can click on.

40. A computer system comprising:

a console comprising a first coupling site, a second coupling site, each coupling site comprising a connector, the console being an enclosure that is capable of housing each coupling site, a serial communication hub controller coupled to an external network, and a plurality of computer modules inserted into said console; each computer module coupled to one of the connectors of the console and comprising, a processing unit, a communication controller coupled to the serial communication hub controller through the connector of the coupling site to support communication with the other modules, a main memory coupled to the processing unit, an interface controller coupled to a differential signal channel for communicating encoded serial bit stream of Peripheral Component Interconnect (PCI) bus transaction, and a graphics controller coupled to the processing unit;

wherein each of the computer modules provide independent processing in the computer system; and wherein one of the computer modules is configured to provide protection against failure of another of the plurality of computer modules.

41. The computer system of claim 40 wherein the differential signal channel comprises two sets of unidirectional serial bit channels which transmit data in opposite directions.

42. The computer system of claim 40 wherein the interface controller couples to a flash memory with PCI configuration information.

43. The computer system of claim 20 wherein the serial bit stream of PCI bus transaction comprises encoded PCI address and data bits.

44. The computer system of claim 20 further comprises a hard disk coupled to the computer module.

45. A computer system comprising:

a console comprising a power supply, a first coupling site, and a second coupling site, each coupling site comprising a connector and a slot, the console being an enclosure housing each coupling site, an Ethernet controller powered by the power supply and coupled to an external network, a plurality of computer modules, each coupled to one of the coupling sites through the connector and the slot; each computer module comprising a processing unit, a main memory coupled to the processing unit, a network controller coupled to the Ethernet controller through the connector of the coupling site to support communication with the external network, and an interface controller coupled to a differential signal channel for communicating encoded serial bit stream of Peripheral Component Interconnect (PCI) bus transaction;

wherein each of the computer modules operates fully independent of each other; and wherein the differential signal channel comprises two sets of unidirectional serial bit channels which transmit data in opposite directions, and wherein one of the computer modules can replace another one of the computer modules in operation.

46. The computer system of claim 45 wherein the encoded serial bit stream comprises 10 bit packets.

47. The computer system of claim 45 further comprises a hard disk drive coupled to the computer module.

48. The computer system of claim 45 wherein the console further houses a power supply that supplies DC power to the Ethernet controller and the computer modules.

49. The computer system of claim 45 wherein the serial bit stream of PCI bus transaction comprises encoded PCI address and data bits.

50. A computer system comprising:

a console comprising an Ethernet hub controller, a first coupling site and a second coupling site, each coupling site comprising a connector and a slot, the console being a first enclosure housing the Ethernet hub controller, the coupling sites, and a plurality of computer modules, each coupled to one of the coupling sites through the connector and the slot; each computer module comprising a processing unit, a main memory coupled to the processing unit, an interface controller coupled to a differential signal channel for communicating an encoded serial bit stream of Peripheral Component Interconnect (PCI) bus transaction to the console through the connector of the coupling site, and an Ethernet controller coupled to the Ethernet hub controller for communication between the computer modules;

wherein each of the computer modules operates fully independent of each other.

51. The computer system of claim 50 wherein the differential signal channel comprises two sets of unidirectional serial bit channels which transmit data in opposite directions.

52. The computer system of claim 50 wherein the computer module further comprises a second enclosure and a hard disk drive wherein the second enclosure houses the hard disk drive.

53. The computer system of claim 50 wherein the encoded serial bit stream comprises 10 bit packets.

54. The computer system of claim 50 wherein the serial bit stream of PCI bus transaction comprises encoded PCI address and data bits.

55. A computer system comprising:

a console comprising an Ethernet controller coupled to an external network, a video switch, a first coupling site and a second coupling site, each coupling site comprising a connector and a slot, the console being an enclosure housing the Ethernet controller, the video switch, each coupling site, and a plurality of computer modules, each coupled to one of the coupling sites through the connector and the slot; each computer module comprising a processing unit, a main memory coupled to the processing unit, a graphics controller coupled to the video switch, and an interface controller coupled to a differential signal channel for communicating an encoded serial bit stream of Peripheral Component Interconnect (PCI) bus transaction to the console through the connector of the coupling site;

wherein each of the computer modules operates fully independent of each other.

56. The computer system of claim 55 wherein the interface controller couples to a flash memory with PCI configuration information.

57. The computer system of claim 55 further comprises a hard disk drive coupled to the computer module.

58. The computer system of claim 55 wherein the console further houses a power supply that supplies DC power to the Ethernet controller and the computer modules.

59. The computer system of claim 55 wherein the serial bit stream of PCI bus transaction comprises encoded PCI address and data bits.

60. A computer system comprising:

a console comprising a first coupling site, and a second coupling site, each coupling site comprising a connector and a slot; the console being an enclosure housing each coupling site, and a serial communication controller coupled to an external network, a plurality of computer modules, each coupled to one of the coupling sites through the connector and the slot; each computer module comprising a processing unit, a main memory coupled to the processing unit, a communication controller coupled to the serial communication controller to support communication with the external network, and an interface controller coupled to a differential signal channel for communicating encoded serial bit stream of Peripheral Component Interconnect (PCI) bus transaction to the console through the connector of the coupling site;

wherein each of the computer modules operates fully independent of each other; and wherein one of the computer modules can replace another one of the computer modules in operation.

61. The computer system of claim 60 wherein the interface controller couples to a flash memory with PCI configuration information.

62. The computer system of claim 60 further comprises a hard disk drive coupled to the computer module.

63. The computer system of claim 60 wherein the differential signal channel comprises two sets of unidirectional serial bit channels which transmit data in opposite directions.

64. The computer system of claim 60 wherein the serial bit stream of PCI bus transaction comprises encoded PCI address and data bits.

65. A computer system comprising:

a console comprising an Ethernet controller coupled to an external network, a first coupling site and a second coupling site, each coupling site comprising a connector and a slot, the console being an enclosure housing the Ethernet controller, each coupling site, and a plurality of computer modules, each coupled to one of the coupling sites through the connector and the slot; each computer module comprising a processing unit, a main memory coupled to the processing unit, a SCSI hard disk drive, an interface controller coupled to a differential signal channel for communicating encoded serial bit stream of Peripheral Component Interconnect (PCI) bus transaction, and a network controller coupled to the Ethernet controller through the connector of the coupling site for communication between the computer modules;

wherein each of the computer modules operates independent of each other; and wherein the differential signal channel couples to the console through the connector of the coupling site; and wherein the encoded serial bit stream transmits 10 bit packets.

66. The computer system of claim 65 wherein the interface controller couples to a flash memory with PCI configuration information.

67. The computer system of claim 65 wherein the SCSI hard disk drive is removable while the computer module is in operation.

68. The computer system of claim 65 wherein the console further houses a power supply that supplies DC power to the Ethernet controller and the computer modules.

69. The computer system of claim 65 wherein the serial bit stream of PCI bus transaction comprises encoded PCI address and data bits.

70. A computer system comprising:

a console comprising a first coupling site and a second coupling site, each coupling site comprising a connector and a slot, the console being an enclosure housing each coupling site, a serial communication controller, and a plurality of computer modules; each computer module coupled to one of the coupling sites through the connector and the slot; each computer module comprising a processing unit, a main memory coupled to the processing unit, an interface controller coupled to a differential signal channel of encoded PCI bus transaction which transmit10 bit packets signals, and a communication controller coupled to the serial communication controller through the connector of the coupling site communicating with two unidirectional serial, differential signal channels which transmit data in opposite directions;

wherein each of the computer modules operates independent of each other.

71. The computer system of claim 70 further comprises a hard disk drive coupled to the computer module.

72. The computer system of claim 70 wherein the encoded PCI bus transaction comprises encoded PCI address and data bits.

73. A computer system comprising:

a console comprising a first coupling site and a second coupling site, each coupling site comprising a connector and a slot, the console being an enclosure housing each coupling site, and a plurality of computer modules; each computer module coupled to one of the coupling sites through the connector and the slot; each computer module comprising a processing unit, a main memory coupled to the processing unit, a graphics controller, a mass storage device coupled to the processing unit, an interface controller coupled to two unidirectional serial, differential signal channels which transmit encoded PCI bus transaction data in opposite directions; and wherein each of the computer modules operates independent of each other; and wherein one of the computer modules can replace another one of the computer modules in operation.

74. The computer system of claim 73 wherein the encoded PCI bus transaction comprises encoded PCI address and data bits.

75. The computer system of claim 73 wherein each of the unidirectional serial differential signal channels comprises one or more pairs of differential signal lines.

76. A computer system comprising:

a console comprising a first coupling site and a second coupling site, each coupling site comprising a connector and a slot, the console being an enclosure housing each coupling site, and a plurality of computer modules; each computer module coupled to one of the coupling sites through the connector and the slot; each computer module comprising a processing unit, a main memory coupled to the processing unit, a graphics controller, a mass storage device coupled to the processing unit, an interface controller coupled to two unidirectional serial, differential signal channels which transmit encoded PCI bus transaction data in opposite directions; and wherein each of the computer modules operates independent of each other; and wherein one of the computer modules is configured to provide protection against failure of another of the plurality of computer modules.

77. The computer system of claim 76 wherein the encoded PCI bus transaction comprises encoded PCI address and data bits.

78. The computer system of claim 76 wherein each of the unidirectional serial differential signal channels comprises one or more pairs of differential signal lines.

79. A computer system comprising:

a console comprising a power supply, a first coupling site and a second coupling site, each coupling site comprising a connector and a slot, the console being an enclosure housing, the coupling sites, and an interface controller coupled to a differential signal channel communicating an encoded serial bit stream of Peripheral Component Interconnect (PCI) bus transaction; and a plurality of computer modules, each computer module coupled to one of the coupling sites through the connector and the slot, comprising, a processing unit, and a main memory coupled to the processing unit, wherein each of the computer modules is similar in design to each other and operates fully independent of each other.

80. The computer system of claim 79 wherein the encoded serial bit stream comprises 10 bit packets.

81. The computer system of claim 79 wherein the differential signal channel comprises two unidirectional signal channels which transmit data in opposite directions.

82. A computer system comprising:

a console comprising a power supply, a multitude of coupling sites, each coupling site comprising, a connector, a slot, and a first interface controller coupled to a differential signal channel communicating an encoded serial bit stream of Peripheral Component Interconnect (PCI) bus transaction, the console being an enclosure housing the coupling sites; and a computer module coupled to one of the coupling sites through the connector and the slot, comprising, a processing unit, a main memory coupled to the processing unit, and a second interface controller coupled to the first interface controllers through the differential signal channel.

83. The computer system of claim 82 wherein the encoded serial bit stream comprises 10 bit packets.

84. A computer system comprising:

a console comprising a first coupling site and a second coupling site, each coupling site comprising a connector and a slot, the console being an enclosure housing, the coupling sites, and an interface controller coupled to two unidirectional serial, differential signal channels which transmit encoded PCI bus transaction data in opposite directions; and a plurality of computer modules, each computer module coupled to one of the coupling sites through the connector and the slot, comprising, a processing unit, a main memory coupled to the processing unit, wherein each of the computer modules is substantially similar in design to each other and wherein the interface controller couples to one of the plurality of computer modules.

85. The computer system of claim 84 wherein the encoded PCI transactions comprise 10 bit packets.

86. A computer system comprising:

a console comprising a power supply, a multitude of coupling sites, each coupling site comprising a connector and a slot, the console being an enclosure housing the coupling sites; and a multitude of computer modules, each computer module coupled to one of the coupling sites through the connector and the slot, comprising, a processing unit, a main memory coupled to the processing unit, and an interface controller coupled to the processor and to a differential signal channel communicating an encoded serial bit stream of Peripheral Component Interconnect (PCI) bus transaction, wherein the differential signal channel couples to the console;

wherein each of the computer modules is substantially similar in design to each other and operates fully independent of each other.

87. The computer system of claim 86 wherein the encoded serial bit stream comprises 10 bit packets.

88. A computer system comprising:

a console comprising a power supply, a first coupling site, and a second coupling site, each coupling site comprising a connector and a slot, the console being an enclosure housing, the coupling sites;

a first interface controller coupled to a differential signal channel communicating an encoded serial bit stream of Peripheral Component Interconnect (PCI) bus transaction; and a plurality of computer modules, each computer module coupled to one of the coupling sites through the connector and the slot, comprising, a processing unit, a mass storage device, and a second interface controller coupled to two unidirectional serial, differential signal channels which transmit encoded PCI bus transaction data in opposite directions;

wherein each of the computer modules is substantially similar in design to each other and operates fully independent of each other.

89. The computer system of claim 88 wherein the encoded PCI bus transaction data in opposite directions comprise 10 bit packets.

* * * * *

US007363415C1

(12) INTER PARTES REEXAMINATION CERTIFICATE (741st)

United States Patent

Chu

(10) Number: US 7,363,415 C1

(45) **Certificate Issued: *Nov. 19, 2013**

(54) COMPUTER SYSTEM UTILIZING MULTIPLE COMPUTER MODULES WITH SERIAL INTERFACE

(75) Inventor: William W. Y. Chu, Los Altos, CA (US)

(73) Assignee: ACQIS LLC, McKinney, TX (US)

Reexamination Request:
No. 95/001,424, Aug. 25, 2010

Reexamination Certificate for:

| | |
|---|---|
| Patent No.: | **7,363,415** |
| Issued: | **Apr. 22, 2008** |
| Appl. No.: | **11/097,694** |
| Filed: | **Mar. 31, 2005** |

( * ) Notice: This patent is subject to a terminal disclaimer.

Related U.S. Application Data

(63) Continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.

| | |
|---|---|
| ***G06F 1/12*** | (2006.01) |
| ***G06F 13/42*** | (2006.01) |

(52) U.S. Cl.
USPC ............ 710/313; 709/227; 710/301; 710/315

(58) Field of Classification Search
USPC ........................................................ 710/313
See application file for complete search history.

(56) References Cited

To view the complete listing of prior art documents cited during the proceeding for Reexamination Control Number 95/001,424, please refer to the USPTO's public Patent Application Information Retrieval (PAIR) system under the Display References tab.

*Primary Examiner* — Majid A. Banankhah

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

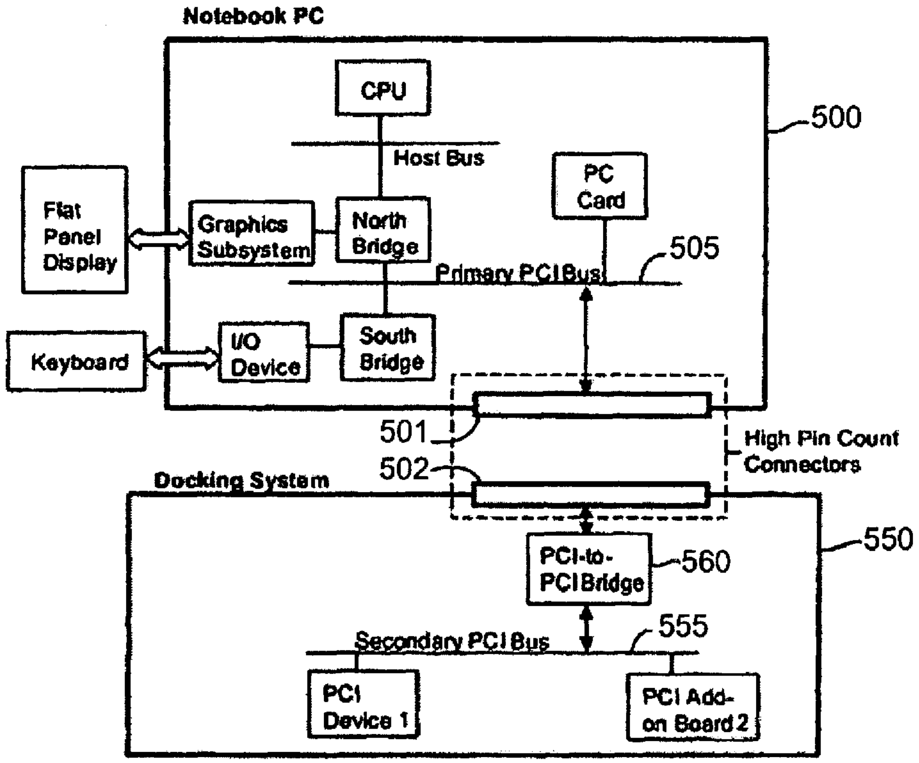

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4-5, 9, 14, 19-24, 29, 34, 38, 43, 49, 54, 59, 64, 69, 72, 74, 77 and 79-89 are cancelled.

Claims 1, 6, 10-11, 15, 25, 30, 35, 40, 44-45, 50, 55, 60, 65, 70, 73 and 76 are determined to be patentable as amended.

Claims 2-3, 7-8, 12-13, 16-18, 26-28, 31-33, 36-37, 39, 41-42, 46-48, 51-53, 56-58, 61-63, 66-68, 71, 75 and 78, dependent on an amended claim, are determined to be patentable.

1. A computer system, comprising:

a console comprising a power supply, a first coupling site and a second coupling site, each coupling site comprising a connector and a slot, the console being an enclosure housing the coupling sites, a serial communication controller powered by the power supply, and a plurality of computer modules; each computer module coupled to one of the coupling [site] *sites* through the connector and the slot, comprising an enclosure, a processing unit, a main memory coupled to the processing unit, a graphics controller, and wherein each of the computer modules is substantially similar in design to each other and operates fully independent of each other; and wherein *each of* the computer [module] *modules* communicates through the connector with the serial communication controller through two sets of unidirectional serial, differential signal channels which transmit data in opposite directions.

*wherein each of the computer modules further comprises an interface controller coupled to the differential signal channels for communicating an encoded serial bit stream of a Peripheral Component Interconnect (PCI) bus transaction, wherein the encoded serial bit stream of the PCI bus transaction comprises encoded PCI address and data bits.*

6. A computer system, comprising:

a console comprising a power supply, a first coupling site and a second coupling site, each coupling site comprising a connector and a slot, the console being an enclosure housing the coupling sites, an Ethernet controller coupled to an external network and powered by the power supply, and a plurality of computer modules; each computer module coupled to one of the coupling [site] *sites* through the connector and the slot, comprising a processing unit, a main memory coupled to the processing unit, an interface controller coupled to a differential signal channel for communicating an encoded serial bit stream of *a* Peripheral Component Interconnect (PCI) bus transaction*, wherein the encoded serial bit stream of the PCI bus transaction comprises encoded PCI address and data bits*, and a network controller coupled to the Ethernet controller through the connector of the coupling site, wherein each of the computer modules is substantially similar in design to each other, and wherein one of the computer modules is configured to provide protection against failure of another of the computer modules.

10. The computer system of claim 6 wherein the Ethernet controller *is* adapted to transfer data between any two of the computer modules and to the external network.

11. A computer system, comprising:

a console comprising an Ethernet hub controller, a first coupling site and a second coupling site, each coupling site comprising a connector and a slot, the console being a first enclosure housing the Ethernet hub controller[,] *and* each coupling site, and a plurality of computer modules, each coupled to one of the coupling sites through the connector and the slot; each computer module comprising a processing unit, a main memory coupled to the processing unit, an interface controller coupled to a differential signal channel for communicating an encoded serial bit stream of *a* Peripheral Component Interconnect (PCI) bus transaction*, wherein the encoded serial bit stream of the PCI bus transaction comprises encoded PCI address and data bits*, and an Ethernet controller coupled to the Ethernet hub controller through the connector of the coupling site for communication between the computer modules; and wherein each of the computer modules operates fully independent of each other.

15. A computer system, comprising:

a console comprising a power supply, a first coupling site and a second coupling site, each coupling site comprising a connector and a slot, the console being a first enclosure housing the coupling sites, a serial communication controller powered by the power supply, and a plurality of computer modules; each computer module coupled to one of the coupling [site] *sites* through the connector and the slot, comprising a processing unit, a main memory coupled to the processing unit, a communication controller coupled to the serial communication controller through the connector of the coupling site communicating with two sets of unidirectional serial, differential signal channels which transmit data in opposite directions, and an interface controller coupled to a differential signal channel for communicating *an* encoded serial bit stream of *a* Peripheral Component Interconnect (PCI) bus transaction*, wherein the encoded serial bit stream of the PCI bus transaction comprises encoded PCI address and data bits*;

wherein each of the computer modules operates fully independent of each other.

25. A computer system, comprising:

a console comprising an Ethernet hub controller, a first coupling site and a second coupling site, each coupling site comprising a connector and a slot, the console being an enclosure housing the Ethernet hub controller[,] *and* each coupling site, and a plurality of computer modules, each coupled to one of the coupling sites through the connector and the slot; each computer module comprising a processing unit, a main memory coupled to the processing unit, a hard disk drive, an interface controller coupled to a differential signal channel for communicating *an* encoded serial bit stream of *a* Peripheral Component Interconnect (PCI) bus transaction*, wherein the encoded serial bit stream of the PCI bus transaction comprises encoded PCI address and data bits*, and an Ethernet controller coupled to the Ethernet hub controller through the connector of the coupling site for communication between the computer modules;

wherein each of the computer modules operates independent of each other, and wherein one of the computer modules can replace another one of the computer modules in operation.

30. A computer system, comprising:

a console comprising a first coupling site, and a second coupling site, each coupling site comprising a connector and a slot; the console being an enclosure housing each coupling site, an Ethernet hub controller, and a plurality of computer modules; each computer module coupled to the coupling site through the connector and the slot, and comprising a processing unit, a main memory coupled to the processing unit, a graphics controller, an interface controller coupled to a differential signal channel for communicating an encoded serial bit stream of *a* Peripheral Component Interconnect (PCI) bus transaction*, wherein the encoded serial bit stream of the PCI bus transaction comprises encoded PCI address and data bits*, an Ethernet controller coupled to the Ethernet hub controller through the connector of the coupling site for communication between the computer modules, and a SCSI hard disk drive;

wherein each of the computer modules is substantially similar in design to each other, and wherein one of the computer modules can provide protection against failure of another one of the computer modules.

35. A computer system, comprising:

a console comprising an Ethernet controller coupled to an external network, a keyboard/mouse multi-port switch, a first coupling site and a second coupling site, each coupling site comprising a connector and a slot, the console being an enclosure housing the Ethernet controller[,] *and* each coupling site, and a plurality of computer modules, each coupled to one of the coupling sites through the connector and the slot; each computer module comprising a processing unit, a main memory coupled to the processing unit, an interface controller coupled to a differential signal channel for communicating *an* encoded serial bit stream of *a* Peripheral Component Interconnect (PCI) bus transaction*, wherein the encoded serial bit stream of the PCI bus transaction comprises encoded PCI address and data bits*, and a network controller coupled to the Ethernet controller through the connector of the coupling site for communication between the computer modules;

wherein each of the computer modules operates fully independent of each other; and wherein the keyboard/mouse multi-port switch switches between keyboard/mouse connection of the computer modules based on a command from a user.

40. A computer system, comprising:

a console comprising a first coupling site, a second coupling site, each coupling site comprising a connector, the console being an enclosure that is capable of housing each coupling site, a serial communication hub controller coupled to an external network, and a plurality of computer modules inserted into said console; each computer module coupled to one of the connectors of the console and comprising, a processing unit, a communication controller coupled to the serial communication hub controller through the connector of the coupling site to support communication with the other modules, a main memory coupled to the processing unit, an interface controller coupled to a differential signal channel for communicating *an* encoded serial bit stream of *a* Peripheral Component Interconnect (PCI) bus transaction*, wherein the encoded serial bit stream of the PCI bus transaction comprises encoded PCI address and data bits*, and a graphics controller coupled to the processing unit;

wherein each of the computer modules provides independent processing in the computer system; and wherein one of the computer modules is configured to provide protection against failure of another of the plurality of computer modules.

44. The computer system of claim [20] *40* further comprises a hard disk coupled to the computer module.

45. A computer system, comprising:

a console comprising a power supply, a first coupling site, and a second coupling site, each coupling site comprising a connector and a slot, the console being an enclosure housing each coupling site, an Ethernet controller powered by the power supply and coupled to an external network, a plurality of computer modules, each coupled to one of the coupling sites through the connector and the slot; each computer module comprising a processing unit, a main memory coupled to the processing unit, a network controller coupled to the Ethernet controller through the connector of the coupling site to support communication with the external network, and an interface controller coupled to a differential signal channel for communicating *an* encoded serial bit stream of *a* Peripheral Component Interconnect (PCI) bus transaction*, wherein the encoded serial bit stream of the PCI bus transaction comprises encoded PCI address and data bits*;

wherein each of the computer modules operates fully independent of each other; and wherein the differential signal channel comprises two sets of unidirectional serial bit channels which transmit data in opposite directions, and wherein one of the computer modules can replace another one of the computer modules in operation.

50. A computer system, comprising:

a console comprising an Ethernet hub controller, a first coupling site and a second coupling site, each coupling site comprising a connector and a slot, the console being a first enclosure housing the Ethernet hub controller[,] *and* the coupling sites, and a plurality of computer modules, each coupled to one of the coupling sites through the connector and the slot; each computer module comprising a processing unit, a main memory coupled to the processing unit, an interface controller coupled to a differential signal channel for communicating an encoded serial bit stream of *a* Peripheral Component Interconnect (PCI) bus transaction to the console through the connector of the coupling site, *wherein the encoded serial bit stream of the PCI bus transaction comprises encoded PCI address and data bits*, and an Ethernet controller coupled to the Ethernet hub controller for communication between the computer modules;

wherein each of the computer modules operates fully independent of each other.

55. A computer system, comprising:

a console comprising an Ethernet controller coupled to an external network, a video switch, a first coupling site and a second coupling site, each coupling site comprising a connector and a slot, the console being an enclosure housing the Ethernet controller, the video switch[,] *and* each coupling site, and a plurality of computer modules, each coupled to one of the coupling sites through the connector and the slot; each computer module comprising a processing unit, a main memory coupled to the processing unit, a graphics controller coupled to the video switch, and an interface controller coupled to a differential signal channel for communicating an encoded serial bit stream of *a* Peripheral Component Interconnect (PCI) bus transaction to the console through the connector of the coupling site, *wherein the encoded serial bit stream of the PCI bus transaction comprises encoded PCI address and data bits*;

wherein each of the computer modules operates fully independent of each other.

60. A computer system, comprising:

a console comprising a first coupling site, and a second coupling site, each coupling site comprising a connector and a slot; the console being an enclosure housing each coupling site, [and]

a serial communication controller coupled to an external network, *and* a plurality of computer modules, each coupled to one of the coupling sites through the connector and the slot; each computer module comprising a processing unit, a main memory coupled to the processing unit, a communication controller coupled to the serial communication controller to support communication with the external network, and an interface controller coupled to a differential signal channel for communicating *an* encoded serial bit stream of *a* Peripheral Component Interconnect (PCI) bus transaction to the console through the connector of the coupling site, *wherein the encoded serial bit stream of the PCI bus transaction comprises encoded PCI address and data bits*;

wherein each of the computer modules operates fully independent of each other; and wherein one of the computer modules can replace another one of the computer modules in operation.

65. A computer system, comprising:

a console comprising an Ethernet controller coupled to an external network, a first coupling site and a second coupling site, each coupling site comprising a connector and a slot, the console being an enclosure housing the Ethernet controller[,] *and* each coupling site, and a plurality of computer modules, each coupled to one of the coupling sites through the connector and the slot; each computer module comprising a processing unit, a main memory coupled to the processing unit, a SCSI hard disk drive, an interface controller coupled to a differential signal channel for communicating *an* encoded serial bit stream of *a* Peripheral Component Interconnect (PCI) bus transaction, *wherein the encoded serial bit stream of the PCI bus transaction comprises encoded PCI address and data bits*, and a network controller coupled to the Ethernet controller through the connector of the coupling site for communication between the computer modules;

wherein each of the computer modules operates independent of each other; and wherein the differential signal channel couples to the console through the connector of the coupling site; and wherein the encoded serial bit stream transmits 10 bit packets.

70. A computer system, comprising:

a console comprising a first coupling site and a second coupling site, each coupling site comprising a connector and a slot, the console being an enclosure housing each coupling site, a serial communication controller, and a plurality of computer modules; each computer module coupled to one of the coupling sites through the connector and the slot; each computer module comprising a processing unit, a main memory coupled to the processing unit, an interface controller coupled to a differential signal channel [of] *conveying an* encoded [PCI] *Peripheral Component Interconnect (PCI)* bus transaction which [transmit] *transmits* 10 bit packets signals, *wherein the encoded PCI bus transaction comprises encoded PCI address and data bits*, and a communication controller coupled to the serial communication controller through the connector of the coupling site communicating with two unidirectional serial, differential signal channels which transmit data in opposite directions;

wherein each of the computer modules operates independent of each other.

73. A computer system, comprising:

a console comprising a first coupling site and a second coupling site, each coupling site comprising a connector and a slot, the console being an enclosure housing each coupling site, and a plurality of computer modules; each computer module coupled to one of the coupling sites through the connector and the slot; each computer module comprising a processing unit, a main memory coupled to the processing unit, a graphics controller, a mass storage device coupled to the processing unit, an interface controller coupled to two unidirectional serial, differential signal channels which transmit *an* encoded [PCI] *Peripheral Component Interconnect (PCI)* bus transaction [data] in opposite directions*, wherein the encoded PCI bus transaction comprises encoded PCI address and data bits*; and wherein each of the computer modules operates independent of each other; and wherein one of the computer modules can replace another one of the computer modules in operation.

76. A computer system, comprising:

a console comprising a first coupling site and a second coupling site, each coupling site comprising a connector and a slot, the console being an enclosure housing each coupling site, and a plurality of computer modules; each computer module coupled to one of the coupling sites through the connector and the slot; each computer module comprising a processing unit, a main memory coupled to the processing unit, a graphics controller, a mass storage device coupled to the processing unit, an interface controller coupled to two unidirectional serial, differential signal channels which transmit *an* encoded [PCI] *Peripheral Component Interconnect* (*PCI*) bus transaction [data] in opposite directions*, wherein the encoded PCI bus transaction comprises encoded PCI address and data bits*; and wherein each of the computer modules operates independent of each other; and wherein one of the computer modules is configured to provide protection against failure of another of the plurality of computer modules.

* * * * *